(12) United States Patent
Takahashi et al.

(10) Patent No.: US 7,203,376 B2
(45) Date of Patent: Apr. 10, 2007

(54) IMAGING APPARATUS AND IMAGING METHOD

(75) Inventors: Hiroshi Takahashi, Kanagawa (JP); Takeshi Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 708 days.

(21) Appl. No.: 10/378,892

(22) Filed: Mar. 5, 2003

(65) Prior Publication Data

US 2003/0169455 A1    Sep. 11, 2003

(30) Foreign Application Priority Data

Mar. 6, 2002    (JP)    ............... 2002-059850

(51) Int. Cl.
*G06K 9/36*  (2006.01)
*G06K 9/38*  (2006.01)

(52) U.S. Cl. ............ 382/252; 382/251; 382/272; 382/274; 358/3.03

(58) Field of Classification Search ........... 382/252, 382/251, 270, 271, 272, 273, 274; 358/465, 358/466, 3.03, 3.05, 3.22, 3.27; 348/405
See application file for complete search history.

(56) References Cited

U.S. PATENT DOCUMENTS

| | | | |
|---|---|---|---|
| 5,414,481 A | 5/1995 | Fujioka et al. | |
| 5,448,656 A * | 9/1995 | Tanaka | ............ 382/252 |
| 5,471,277 A | 11/1995 | Fujioka et al. | |
| 5,548,358 A | 8/1996 | Takahashi | |
| 5,583,607 A | 12/1996 | Fujioka et al. | |
| 5,583,662 A | 12/1996 | Takahashi et al. | |
| 5,689,348 A | 11/1997 | Takahashi et al. | |
| 5,798,841 A | 8/1998 | Takahashi | |
| 5,847,845 A | 12/1998 | Takahashi et al. | |
| 6,055,036 A | 4/2000 | Takahashi | |
| 6,281,990 B1 | 8/2001 | Takahashi | |
| 6,323,963 B1 | 11/2001 | Takahashi | |
| 6,330,050 B1 | 12/2001 | Takahashi et al. | |
| 6,424,429 B1 | 7/2002 | Takahashi et al. | |
| 6,529,918 B2 | 3/2003 | Takahashi | |
| 6,552,822 B1 * | 4/2003 | Kishimoto | ............ 358/3.03 |
| 6,683,702 B1 * | 1/2004 | Loce et al. | ............ 358/3.09 |
| 2001/0019632 A1 | 9/2001 | Shibaki et al. | |
| 2001/0028468 A1 * | 10/2001 | Yamamoto | ............ 358/1.9 |
| 2001/0050780 A1 | 12/2001 | Ohshima | |
| 2002/0003632 A1 * | 1/2002 | Nakano et al. | ............ 358/1.9 |
| 2002/0131061 A1 | 9/2002 | Oayagi et al. | |
| 2003/0090729 A1 * | 5/2003 | Loce et al. | ............ 358/3.06 |

FOREIGN PATENT DOCUMENTS

EP    0 414 505    2/1991

(Continued)

*Primary Examiner*—Matthew C. Bella
*Assistant Examiner*—Ali Bayat
(74) *Attorney, Agent, or Firm*—Oblon, Spivak, McClelland, Maier & Neustadt, P.C.

(57) ABSTRACT

The present invention accurately reproduces an image pattern by referring to neighboring pixels upon determining the threshold value of a target pixel so that a delay in dot generation can be prevented while emphasizing an image transition portion so that both graininess and sharpness are improved in the image. To this end, a neighboring pixel density difference detection part obtains an absolute value of the density difference between a target pixel and its neighboring pixels and selects the density of a neighboring pixel with a large absolute value as a reference pixel density. Further, a threshold value quantity determination part determines a threshold value corresponding to the density selected by the neighboring pixel density difference detection part. Then, a quantization part outputs an output value based on a comparison between the threshold value and a corrected value obtained by adding a pre-calculated error value of neighboring pixels to an input value.

20 Claims, 26 Drawing Sheets

FOREIGN PATENT DOCUMENTS

| | | |
|---|---|---|
| EP | 0 544 511 | 6/1993 |
| JP | 7-111591 | 4/1995 |
| JP | 8-242374 | 9/1996 |
| JP | 10-257302 | 9/1998 |

\* cited by examiner

| 1/16 | 3/16 | 5/16 |
|------|------|------|
| 7/16 | *    |      |

| ADJACENT PIXEL (x-1,y-1) | ADJACENT PIXEL (x,y-1) | ADJACENT PIXEL (x+1,y-1) |
|---|---|---|
| ADJACENT PIXEL (x-1,y) | TARGET PIXEL (x,y) | ADJACENT PIXEL (x+1,y) |
| ADJACENT PIXEL (x-1,y+1) | ADJACENT PIXEL (x,y+1) | ADJACENT PIXEL (x+1,y+1) |

PRIMARY SCANNING DIRECTION →

FIG.25

| (x−5,y−5) | ......... | (x−1,y−5) | (x,y−5) |
|---|---|---|---|
| | | | |
| (x−5,y−1) | ......... | (x−1,y−1) | (x,y−1) |
| (x−5,y) | ......... | (x−1,y) | TARGET PIXEL (x,y) |

PRIMARY SCANNING DIRECTION →

FIG.26

| TARGET PIXEL (x,y) | ......... | (x−4,y) | (x+5,y) |
|---|---|---|---|
| | | | |
| (x,y+4) | ......... | (x+4,y+4) | (x+5,y+4) |
| (x,y+5) | ......... | (x+4,y+5) | (x+5,y+5) |

PRIMARY SCANNING DIRECTION →

· : SMALL DOT  ■ : MEDIUM DOT

· : SMALL DOT  ■ : MEDIUM DOT

• : SMALL DOT   ▪ : MEDIUM DOT

IMAGING APPARATUS AND IMAGING METHOD

BACKGROUND OF THE INVENTION

1. Field of the Invention

The present invention relates to an imaging apparatus that performs an error diffusion process on image data with M gray levels to reproduce an N-level dot image (M>N), the technology being suitable for application in printers, digital copiers, facsimile machines, and the like.

2. Related Art

The imaging quality of printers and the speed of personal computers have significantly improved over the past few years. Particularly, the output resolution of printers has reached a high of 1200×1200 dpi, and some printers are capable of changing the output dot size from a choice of small, medium, to large dots. Achieving a higher resolution in ink jet printers involves increasing the density of the ink heads that spray ink and improving the performance of paper conveyances, or preventing the sprayed ink from spreading on the paper by using ink with high viscosity, for example, and controlling the amount of ink coming out so that the dot size can be changed to obtain a mixture of small, medium, and large sized dots. Also, in electrophotographic printers, the resolution can be improved by increasing the density of the write spots to be irradiated on the photoconductor and reducing the size of the toner particles to be transferred onto the paper, and further, by controlling the amount of irradiation forming one dot through pulse width division of the write beam or by modulating the dot size through varying the intensity of the laser beam used in the above irradiation.

In the ink jet printer, the N-level dot image is reproduced using ink with varying degrees of concentration. Specifically, the ink is divided into light ink and dark ink (normally, the light ink is diluted to one third (⅓) to one sixth (⅙) of the concentration of the dark ink), and in the highlighted portions of the image, the light ink is used whereas in the medium to dark portions, the dark ink is used.

The multi-level gray scale representation according to the ink jet technique in which ink with varying degrees of concentration is used, and the multi-level gray scale representation according to the electrophotographic technique in which the dot size is modulated are both effective technologies for output apparatuses that quantize an image of M gray levels into an N-level dot image (2<N<M), and the above technologies can make a big contribution to improving image quality.

In reproducing an image, graininess is an important factor. The graininess of the highlighted portions of the image can be improved by increasing the density of the dots in the print-out and using ink of varying concentration or modulating the dot size. Normally, small dots unrecognizable by the human eye are evenly distributed.

In a printer that is unable to perform dot size modulation, dot area modulation is used to represent gradation by varying the area occupied by dots. In such a printer, medium density images can be output (or reproduced) with uniform dots with good graininess since the dots are unrecognizable and evenly output. The same applies to high-resolution printers. However, in a printer with low resolution, big dots are output for the highlighted portions of the image and the dots are spaced apart from each other, causing the isolated dots to stand out, and thereby degrading the graininess of the image. In a printer with high resolution, the dot size is smaller and more dots are output, so that the graininess of the highlighted portions will not be much of a problem.

In the dot size modulation technique, the brightness of the highlighted image is represented by numerous small dots so that a finer graininess can be obtained. Also, by using lighter ink (low concentration ink), the output dots will have a lighter shade and will be less recognizable, thereby further improving the graininess.

In general, when supplying image data of M gray levels to a printer capable of outputting an N-level dot image (M>N), a quantization process is performed to reduce the number of gray levels of each pixel. The quantization process may be performed using the error diffusion technique or the minimized average error method, both of which are superior in providing gradation (or change of tone) of graininess and sharpness in the image.

Error diffusion is a dithering or a digital halftoning process in which the quantization error generated during the quantization of a pixel is weighted and distributed to neighboring pixels not yet quantized so that the error can be diffused. The minimized average error minimization technique is another dithering or digital halftoning process in which the image data value of the target pixel is corrected based on the weighted average of the quantization error generated at the neighboring pixels already quantized. In both techniques, the quantization errors are conserved throughout the image; thus an image is reproduced with excellent graininess. The difference between the error diffusion technique and the minimized average error method is only in the timing of performing the error diffusion, and thus, in the following, both of these techniques will be referred to as the error diffusion technique.

FIG. 1 is a diagram illustrating the error diffusion process according to the conventional art. In this error diffusion process, an input (multi-level gray scale image data) 1 and an error value pre-calculated at an error diffusion matrix 7 are added by an adder 2, the calculated result being input to a quantization part 3. Further, the input value of the quantization part 3 and a quantization threshold value are compared so as to determine an output value 4. Then, the difference between the output value 4 and the value input to the quantization part 3 is calculated by a subtractor 5 and the above result is stored in an error memory 6 as the error value of the next target pixel. In performing the above process for the next pixel, the error value for the target pixel (*) is obtained in the error diffusion matrix 7 using the error values of four neighboring pixels, for example, and the obtained error value is then added to the input value 1 by the adder 2. By repeating the above process for each of the pixels, the brightness (gray level) of the image can be conserved in the error diffusion process.

FIG. 2 is a diagram showing the dot output distribution in a 4-level error diffusion process as an example of a multi-level error diffusion process. Given that the four levels of the quantization output values correspond to the input values 0 (dot off), 85 (small dot), 170 (medium dot), and 255 (large dot), the percentage of small dots increases as the density (gray level) increases until reaching 85, and when the input data level reaches 85 the percentage of the small dots becomes 100%. When the input data level is in between 85–170, the percentage of the small dots decreases while the percentage of the medium dots increases. When the input data level reaches 170, the percentage of the medium dots becomes 100%. When the input data level (gray level) is in between 170–225, the percentage of the medium dots decreases while the percentage of large dots increases, and at an input data level of 225, the percentage of the large dots becomes 100%.

Although the error diffusion technique is excellent in graininess (or change of tone) a visual gap is created at the switchover regions of the quantization output values (when the input value exactly corresponds to a quantization output value). This phenomenon will be explained using an example of converting 256 gray levels of image data (each pixel being represented by 8 bits) into 4-level quantized image using error diffusion in which M=256 and N=4, is given. Herein, the 4-level quantization output values from the error diffusion process are denoted as O1 (dot off or blank hole), O2 (small dot), O3 (medium dot), and O4 (large dot), the gray scale corresponding to each of the 4-level quantization output values being 0, 85, 170, and 255, respectively, and the threshold values being the median of each of the output values, namely, 43, 128, and 213. Also, O1 (dot off) represents white and O4 (255; total ink coverage or solid density) represents black in this example; however, this may be reversed.

When error diffusion is performed on a continuous tone image that changes from a gray value of 0 to 128, the gray scale is represented using O1 (dot off) and O2 (small dot) if the input value of the gray scale is below 85. When the input value of the gray scale is 85, it is represented by a 100% density of the output value O2 (small dot). When the input value of the gray scale is above 86, the gray scale is represented by a mixture of output values O2 (small dot) and O3 (medium dot).

FIG. 3 is a diagram showing a result of performing a simple 4-level error diffusion process on a continuous tone image in which the gray value changes from 0 to 128. As shown in FIG. 3, depending on the change rate in the tone gradation and the processing direction, there may be a delay in the output of the output value O3 (medium dot) for the gray scale input value of 86 so that regions filled up with output values O2 (small dot) spread instead. Similarly, the above effect occurs when the error diffusion process is performed on a continuous tone image in which the gray value changes from 128 to 0. Herein, at the gray scale input value of 84, there may be a delay in the output of the output value O1 (dot off) so that regions filled up with output values O2 (small dot) spread instead.

When the quantized output value of the N-level error diffusion and the input value are equivalent, namely, when the input values are 0, 85, 170, and 255 in the above example, the gray scale is represented by filling up the relevant region with O1 (dot off), O2 (small dot), O3 (medium dot), and O4 (large dot), respectively. In these regions, the output values do not mix with other output values; therefore, the frequency characteristics of the image are uniform and a fine graininess can be achieved. On the other hand, in the other regions, the gray scale is represented by a combination of N-level quantized output values, thus in these regions, two output values intermingle and the frequency characteristics of the image will be uneven. That is, in a continuous tone image in which the gray scale changes from 0 to 128, the region in which the gray scale value of the input is 85 has a finer graininess than the rest of the regions, thereby creating an awkwardness in this region.

Similarly, fine graininess is also obtained from input gray scale values of 0 and 255; however, this is different for cases in which the input gray scale values are 85 or 170. In the continuous tone image in which input gray values change from 0–128, the graininess around the gray scale value of 85 changes in the following manner:

random dot image→uniform dot image→random dot image

In the above case, the uniform dot image is situated in between randomly dotted images with the error diffused tones, which makes the difference easily recognizable.

On the other hand, the change in graininess around the gray scale value of 0 will be as follows:

uniform dot image→random dot image

This change is less recognizable. That is, in the regions around the whitened portions (gray scale value 0) and the totally darkened portions (gray scale value 255), awkwardness is less likely to be perceived due to the visual preconceptions of the human eye. In the region close to the gray scale value 0 (gray scale value 1) awkwardness arising from graininess is not really a problem; instead, the problem lies in the delay of the dots being produced in the error diffusion process which results in an increase in the whitened portion.

As previously mentioned, the regions corresponding to the gray scale values 85 and 86 are filled up by the output values O2 (small dot) as shown in FIG. 3. In reality, the region corresponding to the gray scale value 86 should be output primarily with the output value O2 (small dot), along with a small fraction of the output value O3 (medium dot) so as to represent a change in the brightness. However, in the image of FIG. 3, the output value O3 (medium dot) is not output in this region. Due to the delay in the generation of dots at the switchover regions of the 4-level quantization output values, a gray scale gap (contour) is created at the switchover regions, thereby degrading the image quality. Similarly, a gray scale gap (contour) is created at the switchover regions of the gray scale value 170 as well.

Generally, in the N-level error diffusion technique, there will be N−2 regions where awkwardness arises due to exceptionally fine graininess, that is, the regions where the input gray scale exactly corresponds to the output values excluding the whitened portion and the totally darkened portion. The gaps (contours) in the gray scale representation created in these regions (the switchover regions of the N-level quantization output value) are the causes of the image quality degradation.

In the conventional art, there have been a number of technologies developed in response to the above-described problems caused by the delay in dot generation. For example, in Japanese Laid-Open Patent Publication (JPA) No. 7-111591, an image processing apparatus in which the delay in dot generation in highlighted portions of the image and the delay in the dotless blank hole generation in the darkened portions are eliminated in a bi-level error diffusion by varying the threshold values depending on the brightness (density) is proposed. Also, in Japanese Laid-Open Patent Publication (JPA) No. 10-257302, a technology for eliminating the delay in dot generation upon performing a multi-level error diffusion process so as to improve the sharpness of the image is proposed.

The above-mentioned conventional art techniques solve the problem of distortions of the image due to the delay in dot generation; however, the image quality degradation caused by the delay in dot generation at the switchover regions of the N-level quantization output values is not particularly taken into consideration.

Consequently, measures have been taken to make the gaps (contours) less recognizable by adding noise to the switchover regions of the quantization output values and generating medium dots and dot off holes in the respective regions.

FIG. 4 is a diagram showing a result from a 4-level error diffusion process in which a random value with oscillation of ±32 is added to the gray scale value 85.

However, in this method, more medium dots appear in the region corresponding to the gray scale value 85 than in the regions representing gray scale values 86 and 87, thereby reversing the original gray level order. Moreover, since random values are added, the positions of the medium dots and dot off holes generated will be in disarray, thereby degrading the graininess. Further, the above method is not suitable for high speed processing because random values are used.

Thus, prior to the present application, the inventors of the present invention have proposed an imaging apparatus that performs a multi-level error diffusion process in which the delay in dot generation around the quantization output values is eliminated, this invention being disclosed in Japanese Patent Application No. 2002-15863 (not yet laid open). In the error diffusion technique in which M gray scale values are quantized into N levels (M>N>2), the delay in dot generation at the switchover regions of the N-level quantization output values causes the degradation of the image quality. Thus, by dividing the M gray scale values into N−1 sections, and changing the threshold value in each section according to the input gray scale value of the target pixel, the problem concerning the delay in dot generation around the beginning and end of a section, namely, the switchover regions of the N-level quantization output values, is solved.

FIG. 5 is a diagram showing how the threshold value increases according to the input value. According to this drawing, the input values are divided into a plurality of sections, wherein the predetermined threshold value around the beginning of a section is lowered, the threshold value around the end of the section is raised, and the two points are connected by a straight line to obtain the threshold value of the section. In this example, the 4-level error diffusion is performed; therefore, the input values are divided into 3 sections, as shown in FIG. 5. In an error diffusion process of N levels, the regions in which the delay in dot generation occurs are the switchover regions of the quantization output values, and thus, the number of the above regions will be N−2. Therefore, the input value is divided into N−1 sections, and the threshold value of the beginning of a section is lowered so as to facilitate the dot generation and the threshold value of the end of the section is raised so that the dot generation is controlled.

Also, in a bi-level error diffusion process, the delay in dot generation around the highlighted portions and the delay in the dot off hole generation around the fully darkened portions can be eliminated by using a threshold value that increases according to the input value, as shown in FIG. 6.

However, with the threshold value that increases according to the input value as shown in FIG. 6, results from subjective evaluations have shown that the sharpness of the image is degraded due to the inability to accurately reproduce edge portions of the image. That is, with the threshold values being inclined as in FIG. 5 and FIG. 6, the accumulation of error values decreases around the transitional regions of the image so that the dot generation is thwarted, and in turn, the sharpness of the image is degraded.

SUMMARY OF THE INVENTION

The present invention has been developed in response to the above-described problems of the related art and its object is to provide an imaging apparatus that prevents the delay in dot generation so as to accurately reproduce the image pattern by referring to neighboring pixels upon determining the threshold value of a target pixel, and at the same time emphasizes the transition portions of the image. In this way, an imaging apparatus that takes into account both the graininess and the sharpness of the image can be realized.

The present invention employs an error diffusion technique for quantizing an M-level gray scale into N levels (M>N). In the present invention, the M gray levels are divided into N−1 sections, and a threshold value Tn in a section n is determined based on the relationship between input information about a target pixel and information about its neighboring pixels. This arrangement can prevent a delay in dot generation while maintaining sharpness of the image to be reproduced. The information is, for example, density information.

In one aspect, the present invention is an imaging apparatus, comprising:

a quantization part that quantizes an image of M gray levels into an N-level dot image (M>N) by performing an error diffusion process on each pixel using N−1 threshold values, wherein the M gray levels are divided into N−1 sections and the threshold value of at least one section varies depending on an input density of a target pixel;

a neighboring pixel density difference detection part that detects a density of a neighboring pixel of the target pixel; and a threshold value determination part that determines the threshold value used by the quantization part for the target pixel by referring to the density of the neighboring pixel.

The threshold value is determined based on the relationship between the target pixel and each of at least two neighboring pixels in two different directions so as to accurately reproduce the image pattern as well as to improve the sharpness of the image.

The threshold value may be determined so as to have a rising inclination in the divided sections. This arrangement allows an imaging apparatus to generate a continuous multi-level dot output around the quantization output values, thereby realizing a high image quality in the image pattern portion.

The threshold value may be determined from the pixel located on the left of the target pixel along the primary scanning direction and from the pixel located above the target pixel along the sub scanning direction. This arrangement can improve the sharpness in the vertical and horizontal directions of the image.

The threshold value may be determined based on the difference between the target pixel and the pixel to its left and the difference between the target pixel and the pixel above it. This arrangement also improves the sharpness in the vertical and horizontal directions of the image in a simple manner.

The threshold value may also be determined based on the relationship between the target pixel P(x, y) and four adjacent pixels that have already been processed, namely, P(x−1, y−1), P(x, y−1), P(x+1, y−1), and P(x−1, y) so as to equally control the sharpness of the image transition portion in all directions.

The threshold value may also be determined based on the absolute values of the difference in density between the target pixel and each of a plurality of neighboring pixels so as to control the sharpness of the image transition portion.

The threshold value may be obtained based on the square values of the difference in density between the target pixel and each of a plurality of neighboring pixels so as to control the sharpness of the image transition portion.

The threshold value may be determined based on data of a neighboring pixel that has been determined to have a large value from a comparison made by comparing means so that the delay in dot generation can be prevented and the sharpness can be controlled for an emphasizing effect in the image transition portion.

The threshold value may be determined based on the pixel located at the right of the target pixel along the primary scanning direction and the pixel located below the target pixel along the sub scanning direction so that sharpness can be controlled with respect to the density change in the right edge and down edge directions of the image.

Further, the threshold value may be determined based on the relationship between the target pixel P(x, y) and four adjacent pixels that are yet-to-be-processed, namely, P(x+1, y), P(x−1, y+1), P(x, y+1), and P(x+1, y+1) so as to control the sharpness of the density transition portion in the right to downward directions of the image.

The threshold value may also be determined based on the relationship between at least the target pixel and a pixel of a specific direction, and the target pixel and a pixel of a direction symmetric to the above specific direction so as to equally control the degree of emphasis in the density change of the image from both sides.

Further, the degree of emphasis on the density change in the image may be freely controlled by multiplying a selected pixel value by a coefficient.

Also, the degree of emphasis on the density change in the image may be freely controlled by varying the multiplication coefficient depending on the type of image or the output mode of the image.

Additionally, the multiplying coefficient may be set to a value above or equal to 1, so that the degree of emphasis on the density change in the image is raised.

Alternatively, the multiplying coefficient may be set to a value below 1, so that the degree of emphasis on the density change in the image is lowered.

The degree of emphasis on the density change in the image may be freely controlled by adding or subtracting a predetermined number to/from the selected pixel value.

The threshold value may be determined by weighting the coefficient depending on the scanning direction so that the degree of emphasis on the density change in the image can be freely controlled according to the image direction.

BRIEF DESCRIPTION OF THE DRAWINGS

FIG. 25 shows yet another example of reference pixel positions adjacent to the target pixel;

FIG. 26 shows adjacent reference pixel positions that are opposite to the pixels positions of FIG. 25;

DESCRIPTION OF THE PREFERRED EMBODIMENTS

In the following, the preferred embodiments of the present invention are described with reference to the accompanying drawings. First of all, descriptions of an ink jet recording apparatus and a laser printer are given as examples of specific applications of the present invention.

Figure 7:
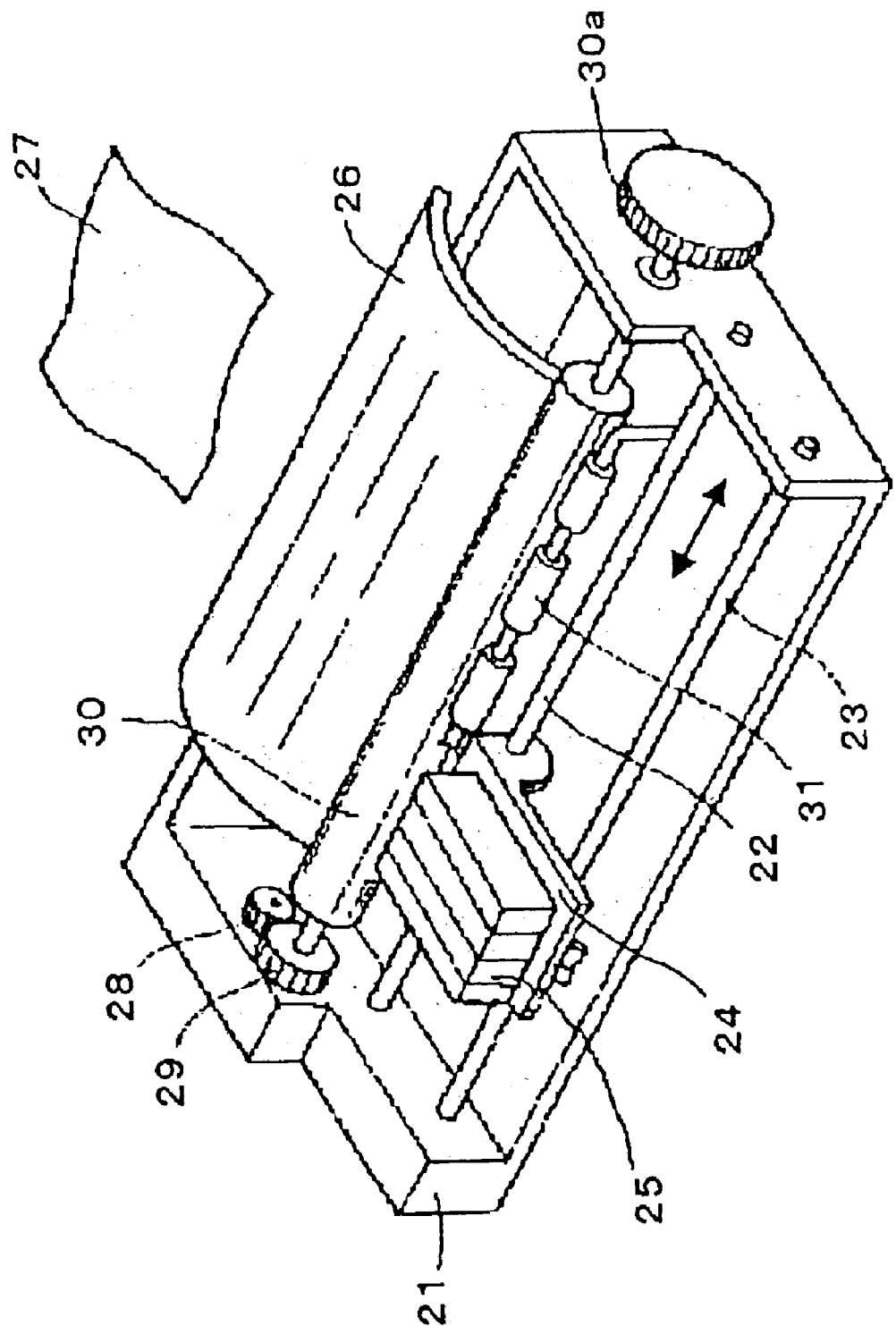
FIG. 7 shows a configuration of an ink jet recording apparatus of the present invention.

FIG. 7 is a diagram illustrating a configuration of an ink jet recording apparatus. The ink jet recording apparatus includes a frame 21, guide rails 22 and 23 mounted across the frame 21, a carriage 24 that is slidably implemented on the guide rails 22 and 23, and an ink jet recording head (referred to as a 'print head' hereinafter) 25 mounted on the carriage 24. The carriage 24 moves in the directions of the arrow shown in the drawing by means of a drive source such as a motor not shown in the drawing so as to enable scanning (primary scanning). Further, the ink jet recording apparatus pulls in a piece of paper 27 set to a guide board 26 using a platen 30 having a sending knob 30*a* that rotates by means of a drive source not shown via a drive gear 28 and a sprocket gear 29, conveys the paper with the periphery surface of the platen 30 and a pressure roller 31 pressed onto the platen 30, and print-records an image onto the paper 27 using the print head 25.

Figure 8:
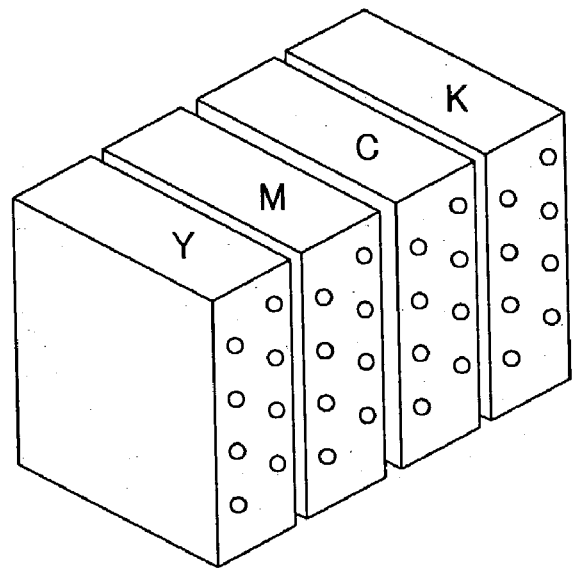
FIG. 8 shows print heads of four colors.
Figure 9:
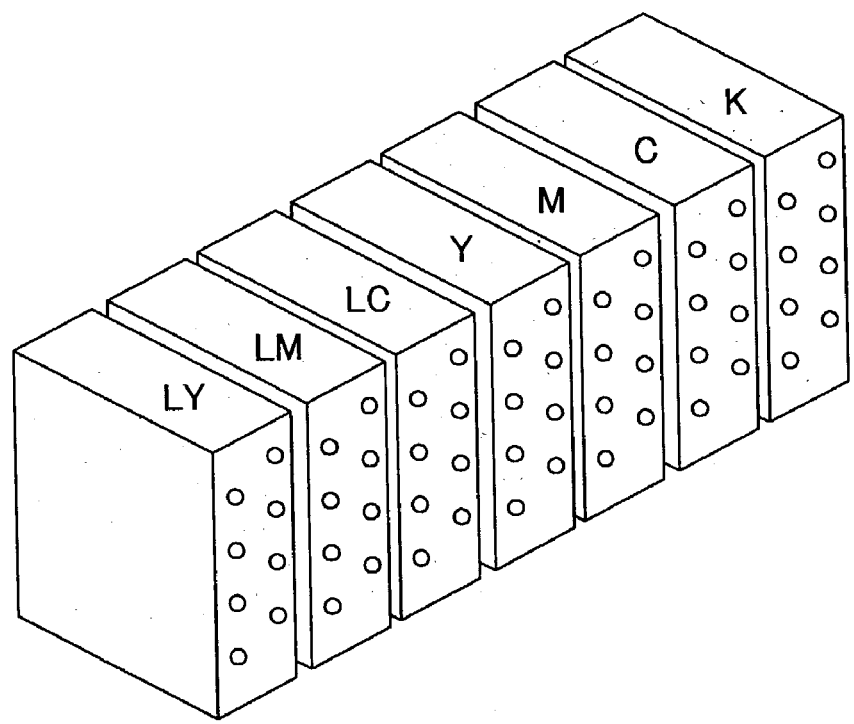
FIG. 9 shows print heads of seven colors.

The print head 25 may consist of four ink jet heads K, Y, M, and C, aligned in the direction of primary scanning and discharging the ink colors black (K), yellow (Y), magenta (M), and cyan (C), respectively, as shown in FIG. 8, or it may consist of seven ink jet heads K, Y, M, C, LY, LM, LC, aligned in the direction of the primary scanning and discharging the ink colors black (K), yellow (Y), magenta (M), cyan (C), light yellow (LY), light magenta (LM), and light cyan (LC), respectively. In some structures of the print head, the number of ink colors can be increased or decreased. Specifically, for example, light yellow can be eliminated since yellow dots in a highlighted portion are not easily perceived (this omission leading to cost reduction), or each of the colors light black, cyan, magenta, yellow, and black may be divided into three or four tone levels thereby realizing a higher image quality. Each of the ink jet heads selectively activates an actuator, which is means for energy generation such as a heater for air bubble generation or a piezoelectric element. Then pressure is applied to the ink contained in a liquid room, causing ink droplets to be sprayed from a nozzle connected to this liquid room and the ink is transferred onto the paper 27 so as to record the image. Herein, the amount of ink sprayed from one nozzle can be controlled by providing numerous drive signals to the actuator, and thus, a multi-level gray scale representation is possible outputting large and small dots, or large, medium and small dots on the paper.

Figure 10:
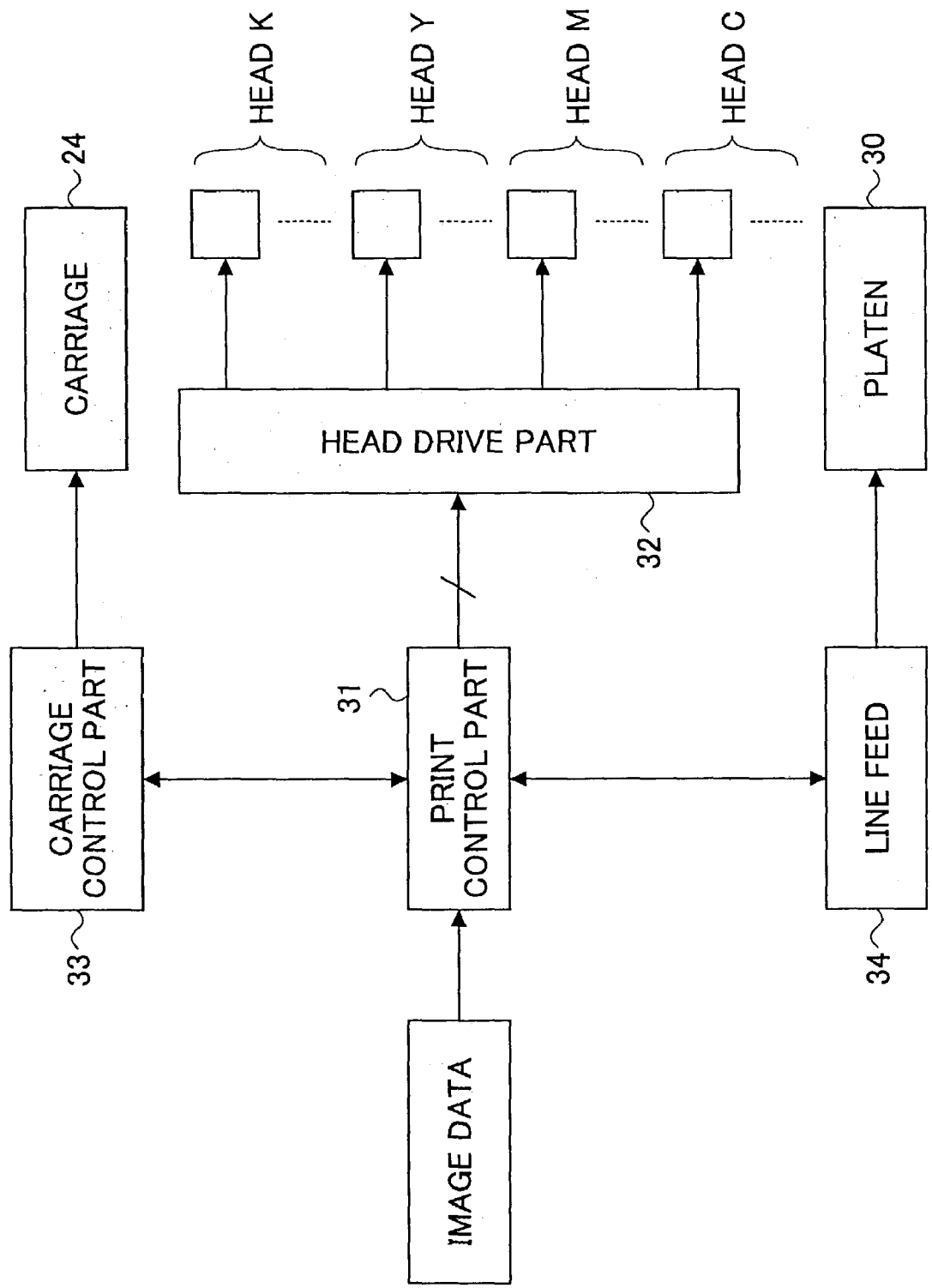
FIG. 10 shows the control part of the ink jet recording apparatus of the present invention.

FIG. 10 is a diagram illustrating the control part of the ink jet recording apparatus. The control part of the ink jet recording apparatus includes a print control part 31 that is provided with print controlling means, a head drive part 32 that drives each of the actuators of the corresponding ink jet heads K, Y, M, and C of the print head 25, a carriage drive control part 33 that controls the carriage 24, a line feed drive control part 34 that controls the rotation of the platen 30, etc. The print control part 31 controls the printing of the ink jet apparatus based on received image data. Namely, each of the heads K, Y, M, and C discharge ink of a predetermined color via the head drive part 32 so that an image corresponding to the received image data is recorded. In the back and forth movement of the carriage 24, the spraying of ink is controlled so that the heads K, Y, M, and C discharge only the ink of a pre-designated color.

Figure 11:
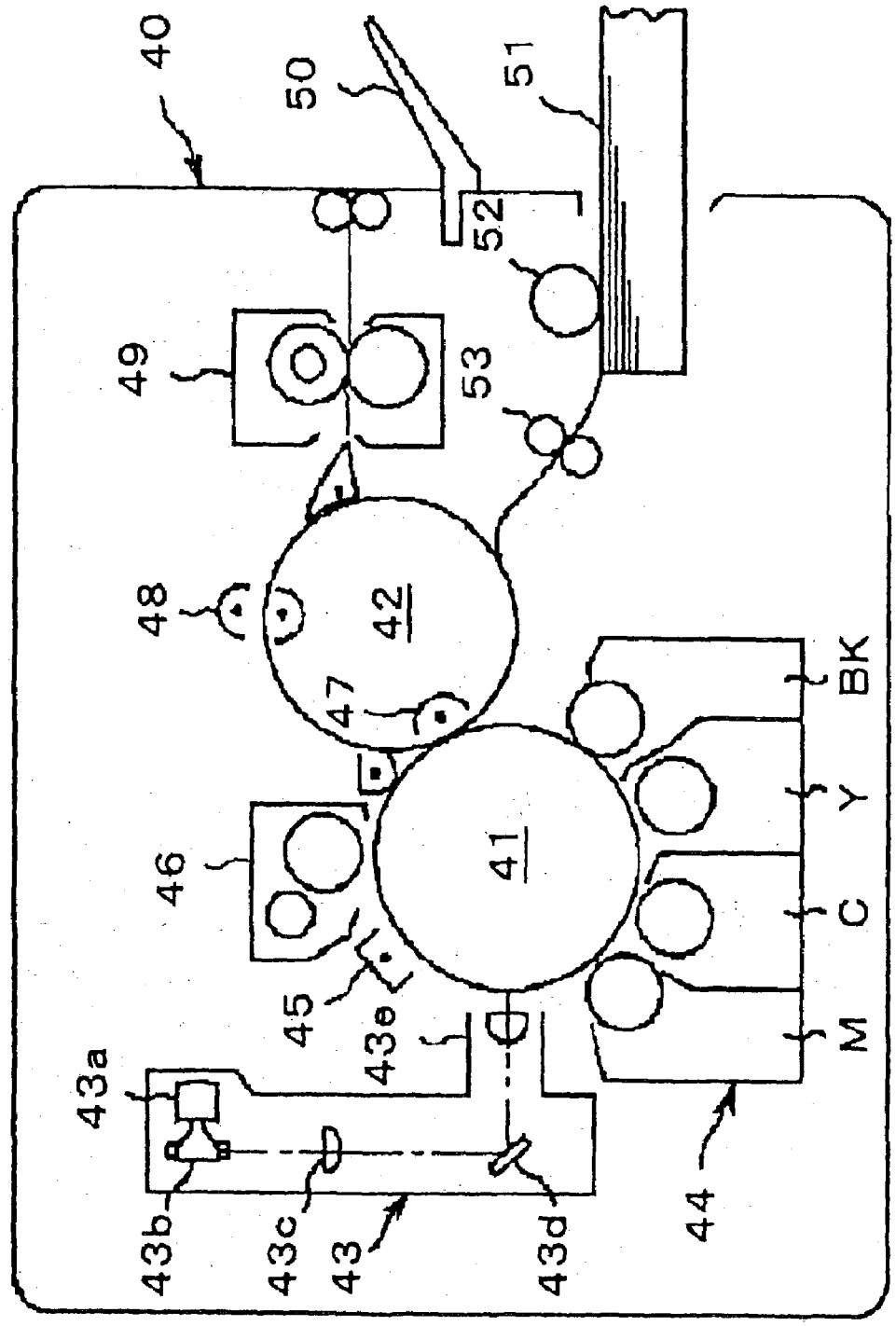
FIG. 11 shows a configuration of a laser printer, which is an imaging apparatus of the electrophotographohic technique.

FIG. 11 is a diagram of a laser printer, which is an imaging apparatus of the electrophotographic technique. A laser printer 40 of FIG. 11 reproduces an image using a photoconductor drum 41. Further, units for performing a series of xerographic processes, namely an electricity charger 45, a beam write unit 43, a developing unit 44, a transfer drum 42, a cleaning unit 46, and the like are implemented around the photoconductor drum 41. The beam write unit 43 has a semiconductor laser (laser diode LD) not shown in the figure, and the laser beam generated by this laser diode LD is deflected along the primary scanning direction by a rotational multi-sided mirror 43*b* functioning as deflection scanning means. Thus, the laser beam passes a lens 43*c*, a mirror 43*d* and a lens 43*e* to be focused onto the surface of the photoconductor drum 41. The rotational multi-sided mirror 43*b* is driven by a polygon motor 43*a* to rotate regularly at a high speed.

An image control part not shown in the figure controls the drive signal of the LD so that the beam generation timing of the LD driven by the multi-level gray scale image signal is synchronized with the laser beam deflection scanning of the rotational multi-sided mirror 43*b*. That is, the beam generation by the LD is controlled so that the photoconductor drum 41 is scanned by the laser beam in the primary scanning direction from a predetermined beam write starting position. The photoconductor drum 41 is uniformly charged with high electrical potential by a corona discharge, this being realized by the electricity charger 45 functioning as the electrifying means, after which the photoconductor drum 41 is irradiated by the laser beam coming from the beam write unit 43 functioning as the beam write means, and thus, a xerographic latent image is formed. The xerographic latent image on the photoconductor drum 41 is made into a visible image by the developing unit 44 functioning as the developing means.

The developing unit 44 has, for example, four sets of development counters M, C, Y, and K that develop the image of the xerographic latent image on the photoconductor drum 41 for each color, magenta (M), cyan (C), yellow (Y), and black (K), respectively. One of the development counters M, C, Y, and K is selectively energized to perform the development process, and the xerographic latent image on the photoconductor drum 41 is developed into a toner image with one of the colors, M, C, Y, or K.

On the other hand, transfer paper accommodated in a paper feeding cassette 51 as the paper feeder apparatus is pulled in by a paper feeding roller 52 and is sent to the surface of the transfer drum 42 at a suitable timing by resist rollers 53. Then, the paper is adhered to the surface of the transfer drum 42 and is moved in accordance with the rotational movement of the transfer drum 42. The toner image on the photoconductor drum 41 is transferred onto the transfer paper on the transfer drum by a transfer charger 47 functioning as transfer means.

In the case of a monochrome copying mode, a monochrome imaging process is performed. The laser diode LD of the beam write unit 43 is modulated with the monochrome image signal, and the monochrome toner image is formed on the photoconductor drum 41. After this toner image is transferred onto the transfer paper, the transfer paper is separated from the transfer drum. At a stabilizer 49, the toner image is stabilized onto the transfer paper, and the paper is then ejected to the ejection tray 50.

In the case of a full color mode, imaging processes of each of the colors are successively performed, wherein the images of each of the colors, Bk, M, C, and Y are successively formed on the photoconductor drum 41. Then, the images of each of the colors, Bk, M, C, Y, successively formed on the photoconductor drum 41, are all transferred onto one transfer paper.

In the above case, the LD of the beam write unit 43 is modulated with a Bk image signal and a Bk toner image is formed on the photoconductor drum 41. Then this Bk toner image is transferred onto the transfer paper on the transfer drum 42. Herein, the transfer paper is not separated from the transfer drum 42, and the LD of the beam write unit 43 is modulated with an M image signal so that an M toner image is formed on the photoconductor drum 42. Then this M toner image is transferred on top of the Bk toner image on the transfer paper placed on the transfer drum 42.

Further, the LD of the beam write unit 43 is modulated with a C image signal and a C toner image is formed on the photoconductor drum 41. Then this C toner image is transferred onto the transfer paper on the transfer drum 42, on top of the Bk toner image and the M toner image, after which the LD of the beam write unit 43 is modulated with a Y image signal so that a Y toner image is formed on the photoconductor drum 41. Then this Y toner image is transferred onto the transfer paper on the transfer drum 42, on top of the Bk toner image, the M toner image, and the C toner image. In this way, a full-color image is formed. After the transfer of the toner images for all the colors, Bk, M, C, and Y is completed, the transfer paper on the transfer drum 42 is separated from the transfer drum 42 by a separation charger 48. Then the toner images are stabilized at the stabilizer 49, after which the transfer paper is ejected to the ejection tray 50.

In the above, an exemplary description of the imaging operation has been given; however, a color imaging apparatus according to the present invention is not limited to the above configuration. For example, instead of the transfer drum 42, an intermediary transfer component such as an intermediary transfer belt can be used. Herein, each of the toner images of the four colors, Bk, M, C, and Y are formed onto the photoconductor drum, and the toner images are successively transferred onto the intermediary transfer belt, one on top of the other, after which the combined toner image is transferred onto a transfer paper. Also, the imaging apparatus of the present invention may only have a monochrome Bk toner.

Figure 12A:
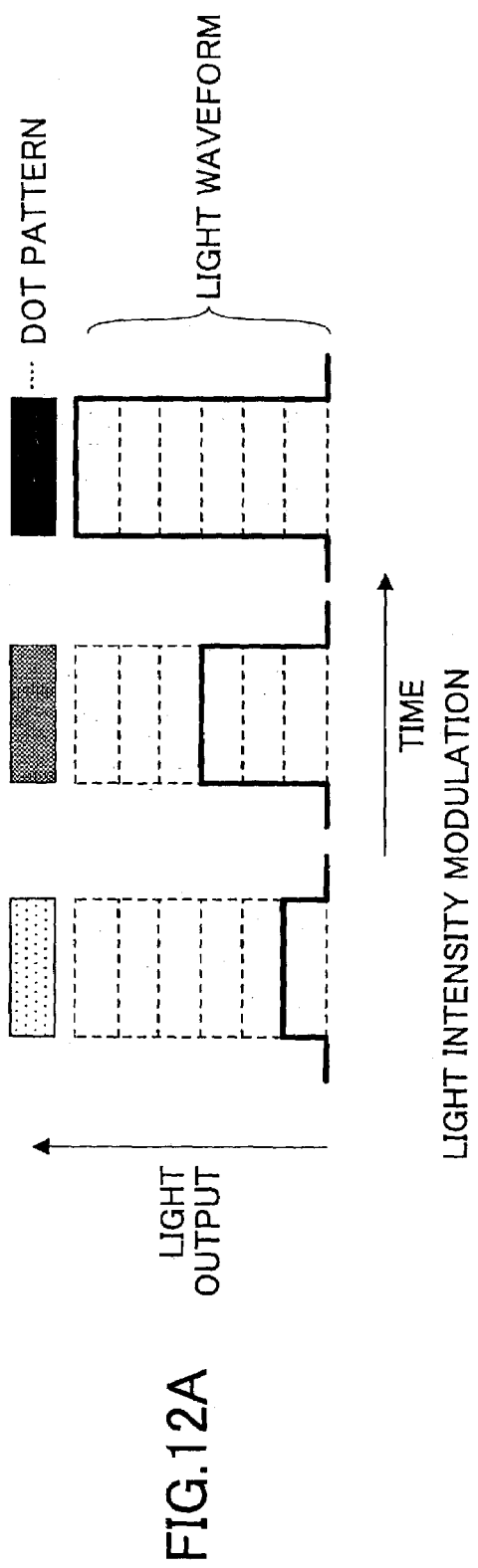
FIGS. 12A and 12B show light waveforms and dot patterns in a light intensity modulation technique and a pulse width modulation technique, respectively.
Figure 12B:
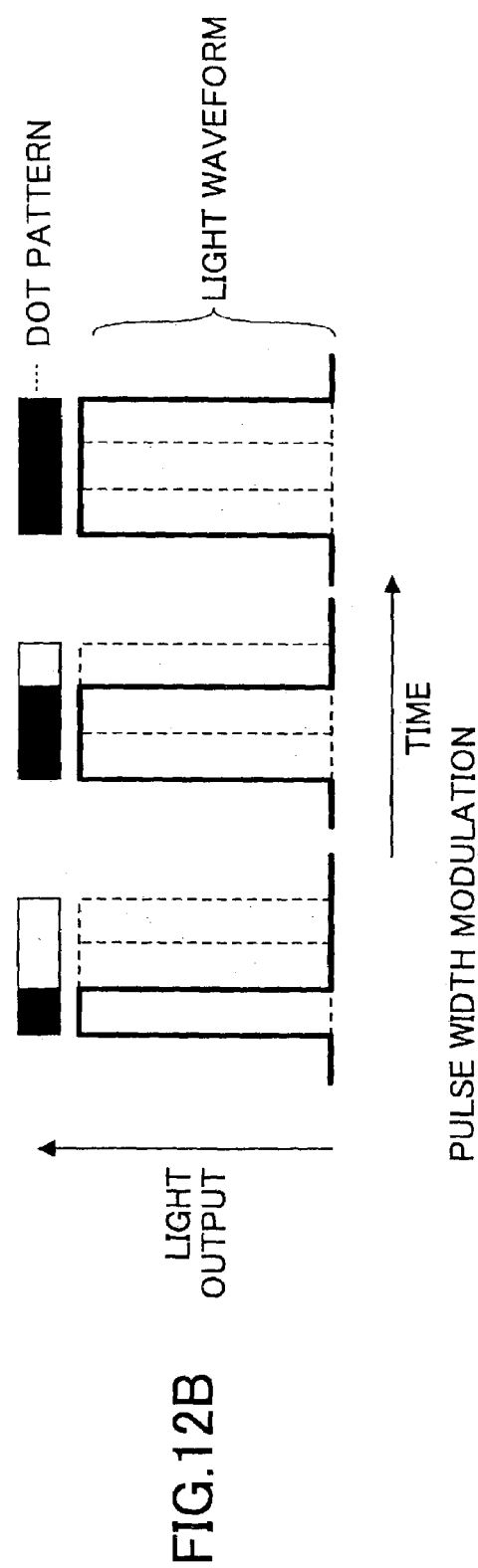

In the following, a description of the LD multi-level modulation will be given. As the LD multi-level modulation method for a one dot multi-level output, there is the pulse width modulation (PWM) method and the light intensity modulation (PM) method. FIGS. 12A and 12B are diagrams illustrating light waveforms and dot patterns in the light intensity modulation method and the pulse width modulation method, respectively. Each of these modulation methods will be described in detail in the following.

The light intensity modulation method uses the intermediate irradiation region to realize halftone recording (halftone image formation). Thus, the stabilization of the imaging process is an important criterion for this method and the requirements for the imaging process are quite strict. However, in this method, the LD control modulation is facilitated. That is, the light intensity modulation method is a method of writing the beam by changing the light output level itself, as shown in FIG. 12A, and each dot pattern is output in the form shown at the top of FIG. 12A. In this method, the control modulation part of the LD may have a simple and small configuration. However, since the intermediate irradiation region is used to develop the halftone image, stability of the imaging process such as the stability of the development bias is greatly demanded.

On the other hand, in the pulse width modulation method, the light output level itself consists of only two values. However, this method is a write beam method of changing the luminescence time, namely, the pulse width, and each of the dot patterns are output in the form shown at the top of FIG. 12B. Since this method is essentially a bi-level write beam method, the intermediate irradiation region is less frequently used compared to the light intensity modulation method. The intermediate irradiation region can be minimized further by combining adjacent dots, and thereby, the requirements for the imaging process can be reduced. In either one of the LD multi-level modulation methods, multi-level output is possible in the electrophotographic process.

Figure 6:
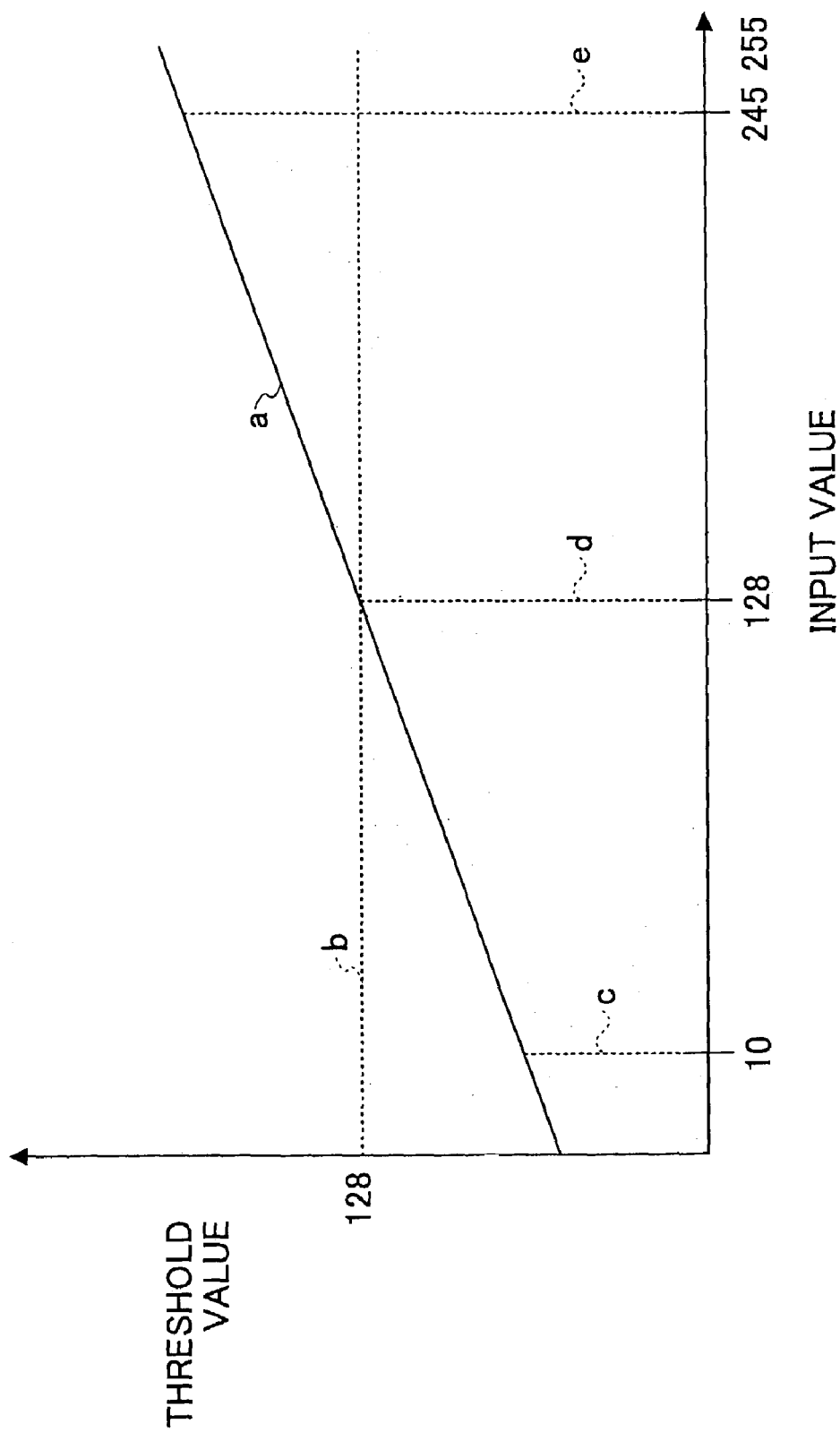
FIG. 6 shows a threshold value that increases according to the input value in a bi-level error diffusion process.

As previously mentioned, in the bi-level error diffusion process, the delay in dot generation can be eliminated by using a threshold value that increases according to the input value as shown in FIG. 6. FIG. 6 shows an example of the threshold value that increases according to the input value. In FIG. 6, line (a) indicates a sloped threshold value for the bi-level error diffusion process, and dotted line (b) indicates a fixed threshold value 128 for the bi-level error diffusion process. Dotted line (c) is a support line that indicates the threshold value when the input value is 10, dotted line (d) is a support line indicating the threshold value when the input value is 128, and dotted line (e) is a support line indicating the threshold value when the input value is 245.

As shown in FIG. 6, the threshold value (c) for the input value 10 is set to a lower value than the fixed threshold value (b) so that dots can be generated even when error values are not greatly accumulated. Similarly, the threshold value (e) for the input value 245 is set to a higher value than the fixed threshold value (b) so that dot off holes can be generated even when negative error values are not greatly accumulated. In the above, the delay in the generation of dots and dot off holes is improved by manipulating the threshold value; however, the density can be conserved since positive and negative error values are properly diffused.

Figure 13:
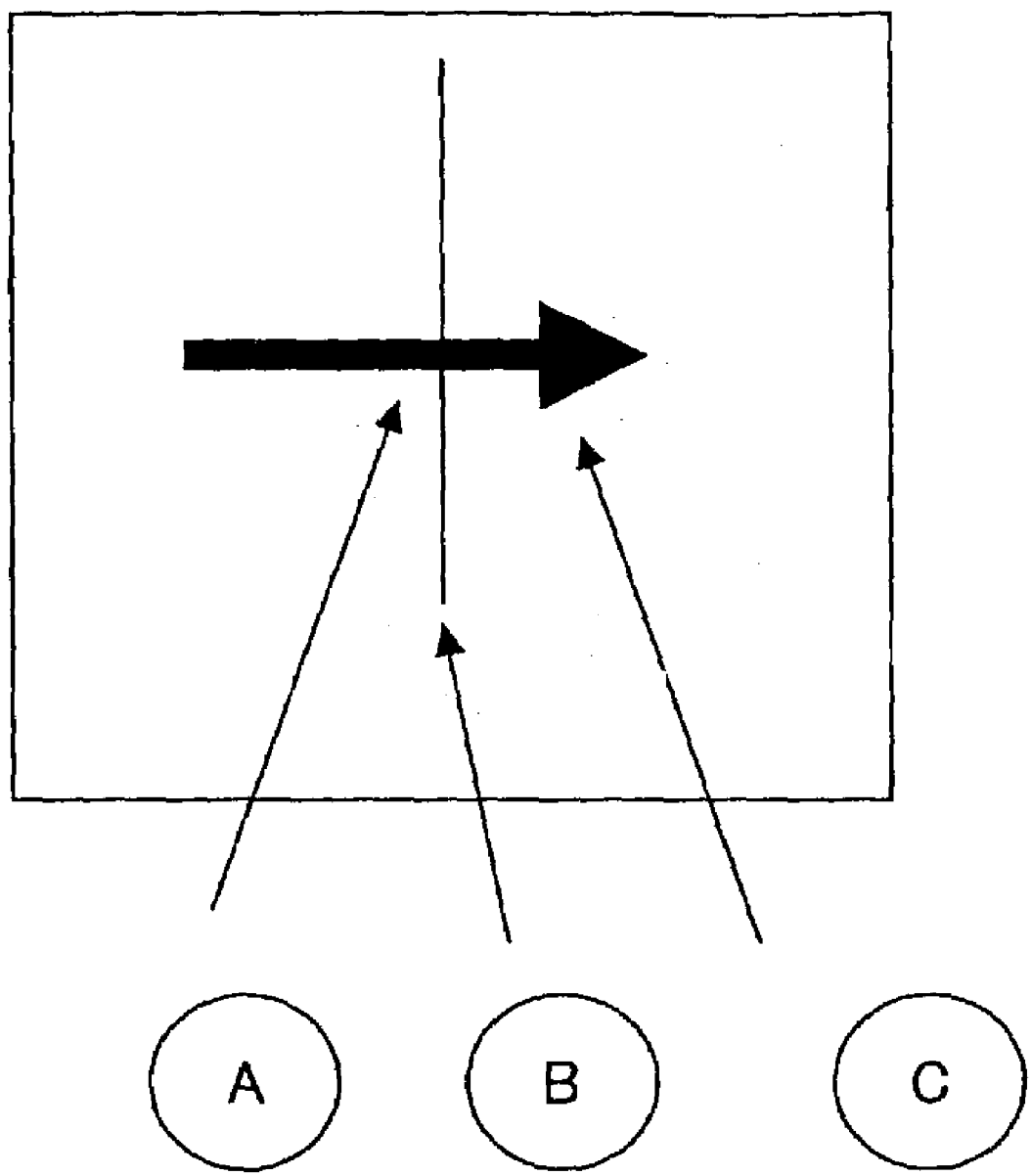
FIG. 13 shows an image of a thin line.
Figure 14:
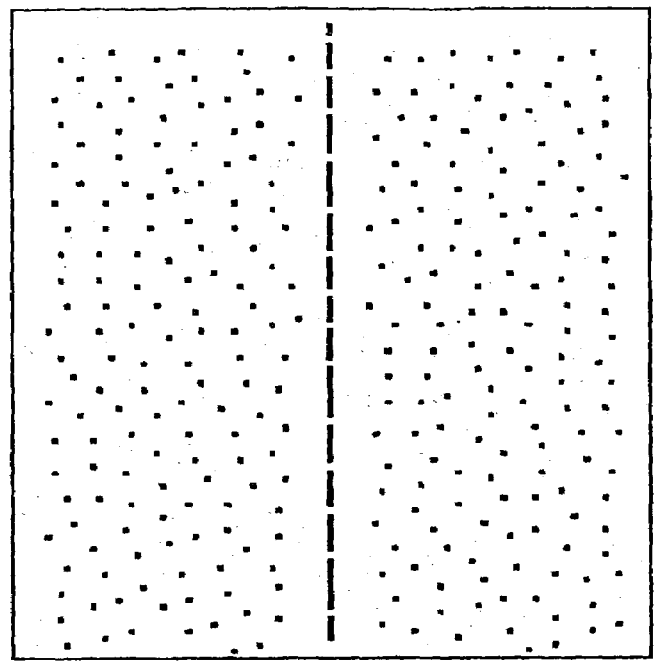
FIG. 14 shows the result of performing a simple bi-level error diffusion process (with a fixed threshold value) on the image of FIG. 13.
Figure 15:
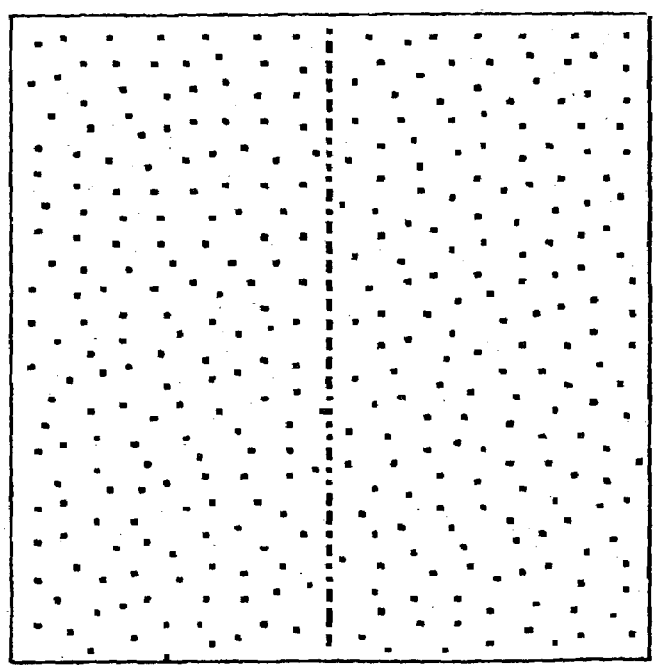
FIG. 15 shows the result of performing a bi-level error diffusion process using the threshold value of FIG. 6 on the image of FIG. 13.

FIG. 13 illustrates an image of a thin line (B) with a width of 1 pixel and having a gray scale value of 128 drawn in a background having a gray scale value 10 (A, C). The bold arrow in this drawing indicates the primary scanning direction of the error diffusion process. FIG. 14 shows the result of performing a simple bi-level error diffusion process (using a fixed threshold value) on the image of FIG. 13. FIG. 15 shows the result of performing a bi-level error diffusion process using the threshold value shown in FIG. 6. Upon comparing FIGS. 14 and 15, it can be discerned that the delay in dot generation around the region where the line is drawn is improved (reduced) in FIG. 15. However, in FIG. 15, the sharpness of the image is degraded as a result of using the threshold value of FIG. 6 in the error diffusion process.

The cause of the above degradation in the sharpness of the image is described with reference to a case in which a one dimensional error diffusion process is performed on the image of FIG. 13 as an example. That is, when error diffusion is performed in the direction of the arrow in FIG. 13, the threshold value corresponding to the gray scale value 10 is selected for the background portions A and C, and the threshold value corresponding to the gray scale value 128 is selected for the edge portion B. With an edge that increases in gray scale value as that shown in FIG. 13, the threshold value increases dramatically at the edge portions and thus, a delay in the dot generation in these areas arises. This in turn limits the reproduction capabilities of the imaging process.

Hence, in order to improve the sharpness of an edge with a raised gray scale value such as that shown in FIG. 13, the following conditions must be met:

(1) dots are generated at the edge portion (2) dots are less easily generated around the edge portion Thus, by delaying the change in the threshold value of the edge portion (target pixel) by a few pixels so that the threshold value does not suddenly increase, the dot generation is facilitated in the edge portion. In the areas surrounding the edge portion, the delay is made so that the threshold value is raised, which hinders the dot generation. As a result, an image with good sharpness can be obtained. A delay in the change of the threshold value by one pixel is sufficient for obtaining an image with fine sharpness.

In the example of FIG. 13, the threshold value corresponding to the gray scale value 10, which is the gray scale value of the pixel right before the target pixel (edge portion) with respect to the primary scanning direction, is selected as the threshold value of the edge portion (target pixel) rather than the originally assumed threshold value corresponding to the gray scale value 128, which is higher. In this way, the threshold value can be prevented from suddenly increasing at the edge portion and the dot generation is eased.

Further, upon processing the pixel next to the edge portion on the right hand side, the threshold value corresponding to the gray scale value 128, which is the gray scale value of the pixel right before the target pixel with respect to the scanning direction, namely, the higher threshold value is selected so that the dots are less easily generated. In this way, the dot generation is facilitated at the edge portion and the dot generation is delayed at the right side adjacent pixel.

As described above, when the threshold value corresponding to the gray scale value 10 is selected at the edge portion, the threshold value is sufficiently lower than the fixed threshold value (128) so that a dot is easily output even when error values are not accumulated. Since the dot is output as a result of a low threshold value, a large negative error value is held at the pixel position of gray scale value 128.

Figures 16, 17:
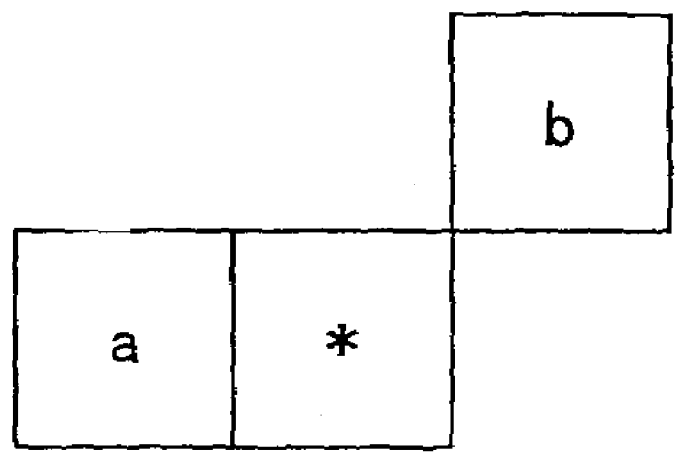
FIG. 16 shows coefficients for weighting the error values of neighboring pixels.
FIG. 17 shows an error matrix that refers to error values of a left side adjacent pixel (a) and a upper right hand pixel (b) of a target pixel (*)

FIG. 16 shows a matrix designating the sum of products of weighted error values. When this so-called error matrix is used, the following two effects can be obtained.

First, the dot generation on the right side of the edge portion is delayed and the image quality is improved. The values 1/16, 3/16, 5/16, and 7/16 in FIG. 16 represent coefficients for obtaining the sum of products of the weighted error values of neighboring pixels, and (*) indicates the position of the target pixel. In an error matrix as shown in FIG. 16, the diffusion of a negative error value at a pixel on the left side of the target pixel makes the dot less likely to be generated by 2–3 pixels.

Second, the dot generation at the lower left hand side of the edge portion is delayed and the image quality is improved. In an error matrix as shown in FIG. 16, the dot generation is delayed due to the negative error value at the upper right hand side pixel position with respect to the target pixel. This effect can be achieved not only by the coefficients of the error matrix of FIG. 16 but also by an error matrix as shown in FIG. 17 wherein the error values of the left hand adjacent pixel (a) and the upper right hand side pixel (b) of the target pixel (*) are referred to.

Similarly, in the case of an edge with a lowered gray scale value from 245 to 128, for example, the threshold value is selected depending on the density of the pixel right before the target pixel so that dot generation is prevented in the edge portion with a lowered gray scale value thereby improving the sharpness of the image.

The above-described process is for the edge portion; however, a similar process is performed on the non-edge portions (background) as well. Namely, a process of selecting the threshold value corresponding to the density of the pixel right before the target pixel is implemented on the background portion of FIG. 13. Herein, the threshold value corresponding to the density of the pixel right before the target pixel is equivalent to that of the target pixel itself Thus, in the background where there is no sudden change in the density of pixels, there is no problem in selecting the threshold value corresponding to the density of the pixel right before the target pixel.

In the above, a one-dimensional error diffusion process has been described. In the case of a two-dimensional error diffusion process, the sharpness is preferably improved for both the primary and sub scanning directions. To realize this, the edge portions that should be emphasized in the primary and sub scanning directions are detected and a determination as to which edge (in which direction) should be optimized is made.

Figure 18:
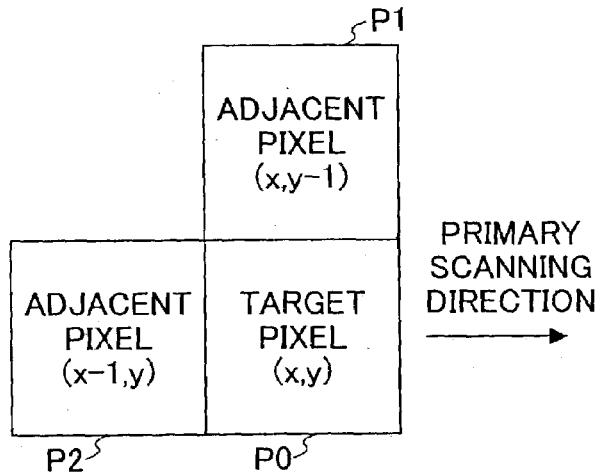
FIG. 18 shows an example of reference pixel positions adjacent to a target pixel.

For example, in the following, a two-dimensional error diffusion process for an edge with a raised gray scale value is described. In FIG. 18, the coordinates of the target pixel P0 are denoted as (x, y), the coordinates of the adjacent pixel P2 with respect to the primary scanning direction are denoted as (x−1, y), the coordinates of the adjacent pixel P1 with respect to the sub scanning direction are denoted as (x, y−1), and the densities of each of the above pixels are denoted as P(x, y) P(x−1, y) and P(x, y−1), respectively. Since the edge that needs to be emphasized is where the density suddenly changes, a comparison is made between the density differences P(x, y)−P(x−1, y) and P(x, y)−P(x, y−1) to select the edge that needs to be emphasized in the primary scanning direction and the sub scanning direction.

Figure 19:
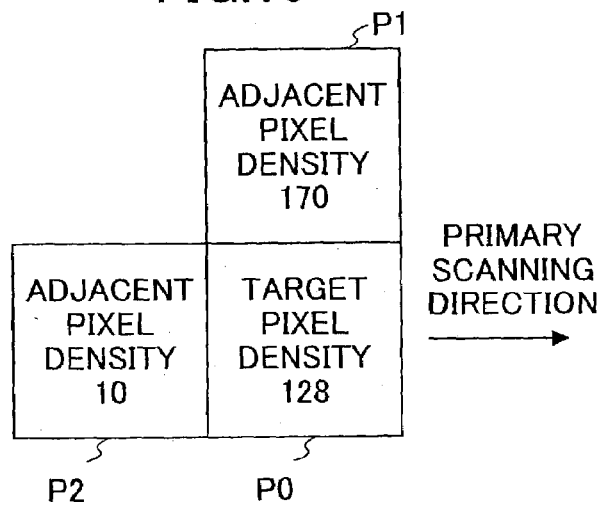
FIG. 19 shows an example of density values (i.e. gray levels) of the target pixel and its adjacent pixels for describing a raised density change and a lowered density change.

The above edge may be either an edge with increased density or an edge with decreased density. For example, in FIG. 19, the density of the target pixel P0 is 128, the density of the adjacent pixel P1 is 170, and the density of the adjacent pixel P2 is 10. In this case, from the pixel P2 to the pixel P0 there is an increase in density from 10 to 128, and from the pixel P1 to the pixel P0, there is a decrease in density from 170 to 128. When both a raised density edge and a lowered density edge lie next to the target pixel at the same time, the density difference at the raised edge and the density difference at the lowered edge will have differing positive/negative signs.

Thus, in order for the above two-dimensional error diffusion process to function properly, the density difference needs to be compared in terms of absolute values |P(x, y)−P(x−1, y)| and |P(x, y)−P(x, y−1)| in determining which edge (in which direction) should be optimized with regard to the sharpness. In practice, the absolute value of the density difference is calculated as the square value of the density difference: {P(x, y)−P(x−1, y)}×{P(x, y)−P(x−1, y)}, and this is used in the comparison.

When the direction of the edge (density change) to be optimized is the direction of primary scanning, the density of the coordinates (x−1, y) of the pixel P2 is referred to in determining the threshold value of the target pixel. When the above direction is the sub scanning direction, the density of the coordinates (x, y−1) of the pixel P1 is referred to in determining the threshold value of the target pixel.

Figure 20:
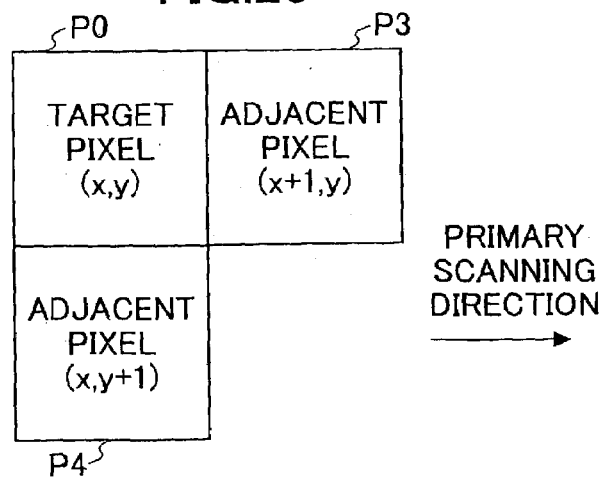
FIG. 20 shows another example of reference pixel positions adjacent to the target pixel.

The above-described adjacent pixel to the target pixel is not limited to that shown in FIG. 18. For example, in FIG. 20, the coordinates of the target pixel P0 are denoted as (x, y), the coordinates of the adjacent pixel P3 with respect to the primary scanning direction are denoted as (x+1, y), the coordinates of the adjacent pixel P4 with respect to the sub scanning direction are denoted as (x, y+1), and the threshold value corresponding to the pixel density of the adjacent pixels P3 and P4 not yet processed may be used.

(Embodiment 1)

Figure 1:
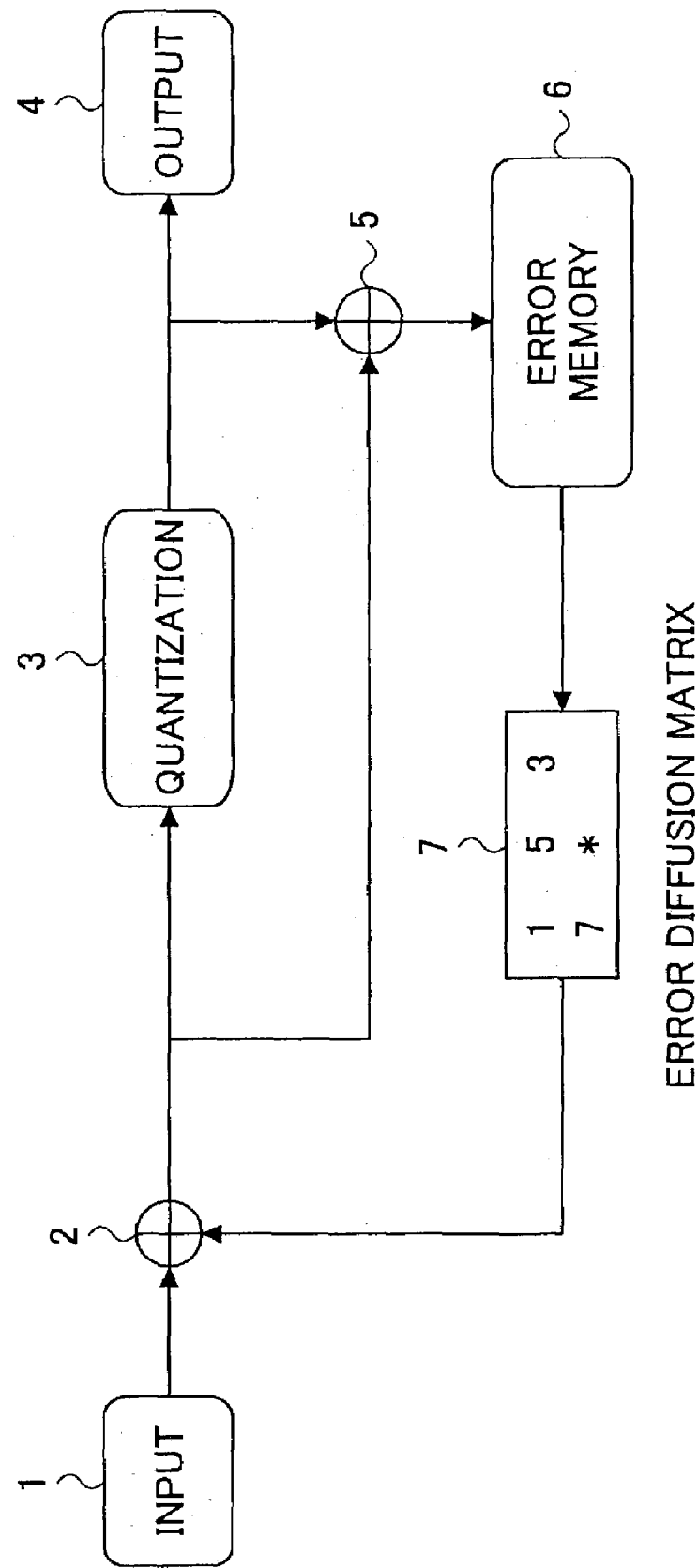
FIG. 1 shows a configuration of an error diffusion process of the convention art.
Figure 2:
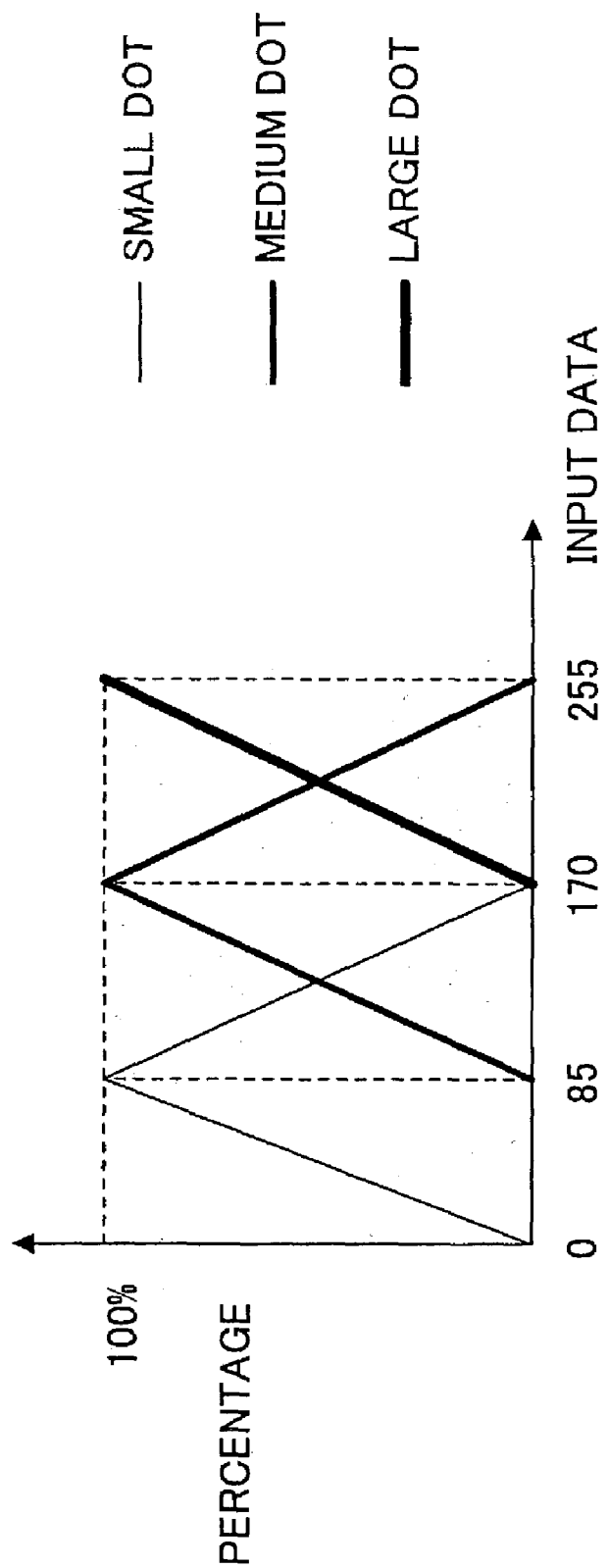
FIG. 2 shows the dot output distribution in a 4-level error diffusion process.
Figure 3:
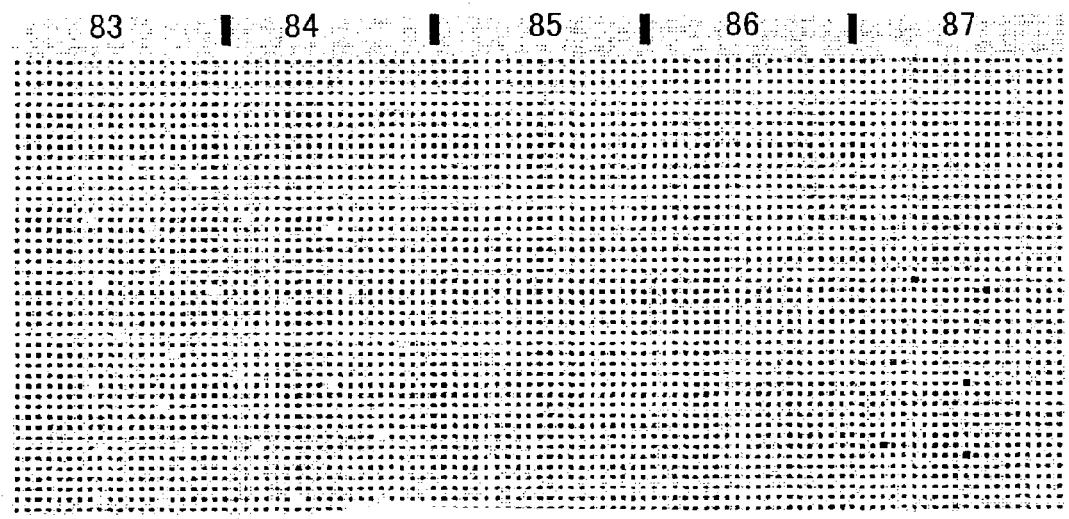
FIG. 3 shows the result of performing a simple 4-level error diffusion process on a continuous tone image in which the gray level changes from 0 to 128.
Figure 4:
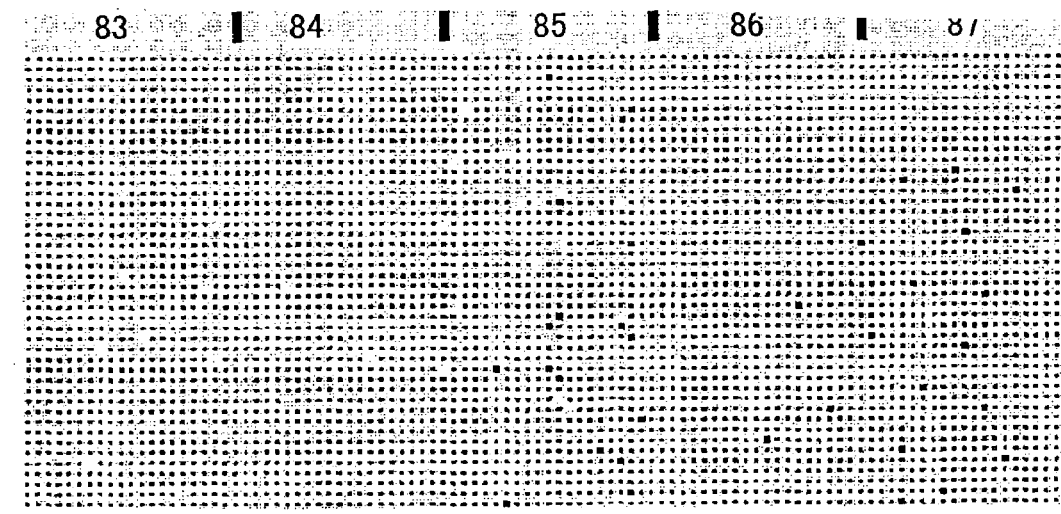
FIG. 4 shows the result of adding a random number having an oscillation of ±32 to the gray value 85 during the 4-level error diffusion process.
Figure 5:
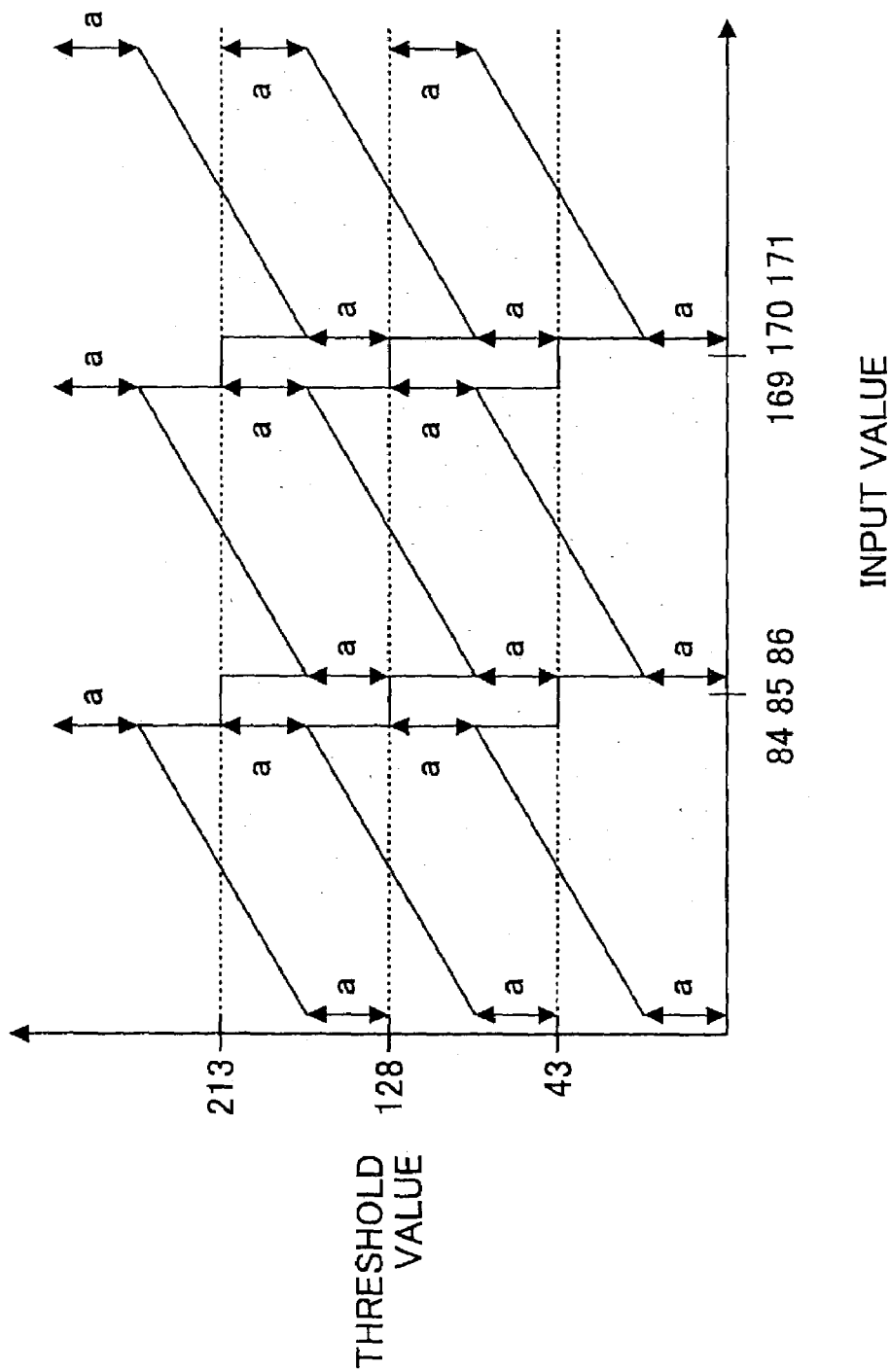
FIG. 5 shows a threshold value that increases according to the input value, this being proposed by the inventors of the present invention prior to the present application.
Figure 21:
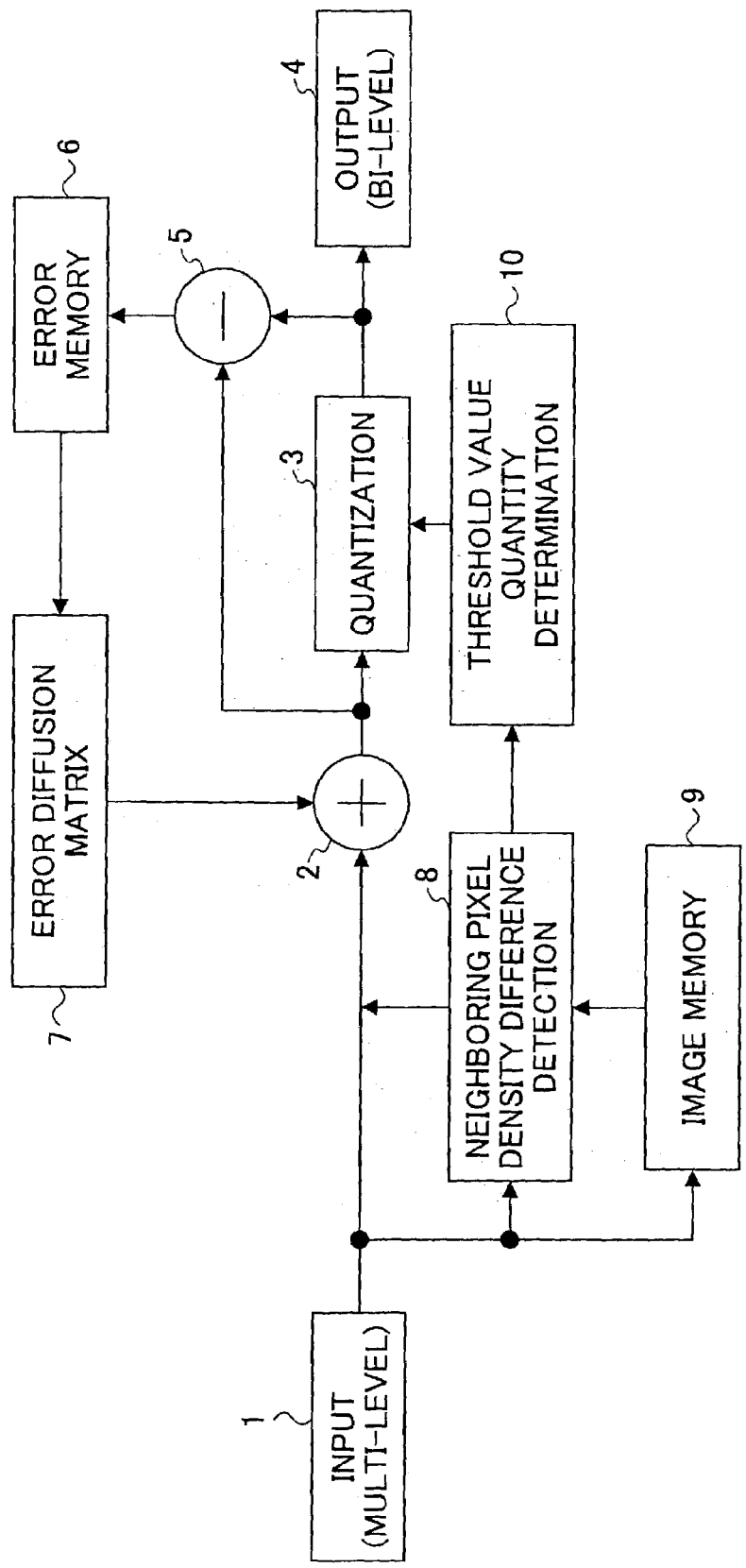
FIG. 21 shows a configuration of a first embodiment of the present invention.

FIG. 21 is a diagram illustrating the configuration of a bi-level error diffusion process according to a first embodiment of the present invention. In this drawing, the input (multi-level) 1, the adder 2, the quantization part (bi-level) 3, the output 4 (bi-level), the subtractor 5, the error memory 6, and the error diffusion matrix 7 are the same as those of the conventional art shown in FIG. 1. In the present invention, a neighboring pixel density difference detection part 8, an image memory 9, and a threshold value quantity determination part 10 are added to the configuration.

Figure 22:
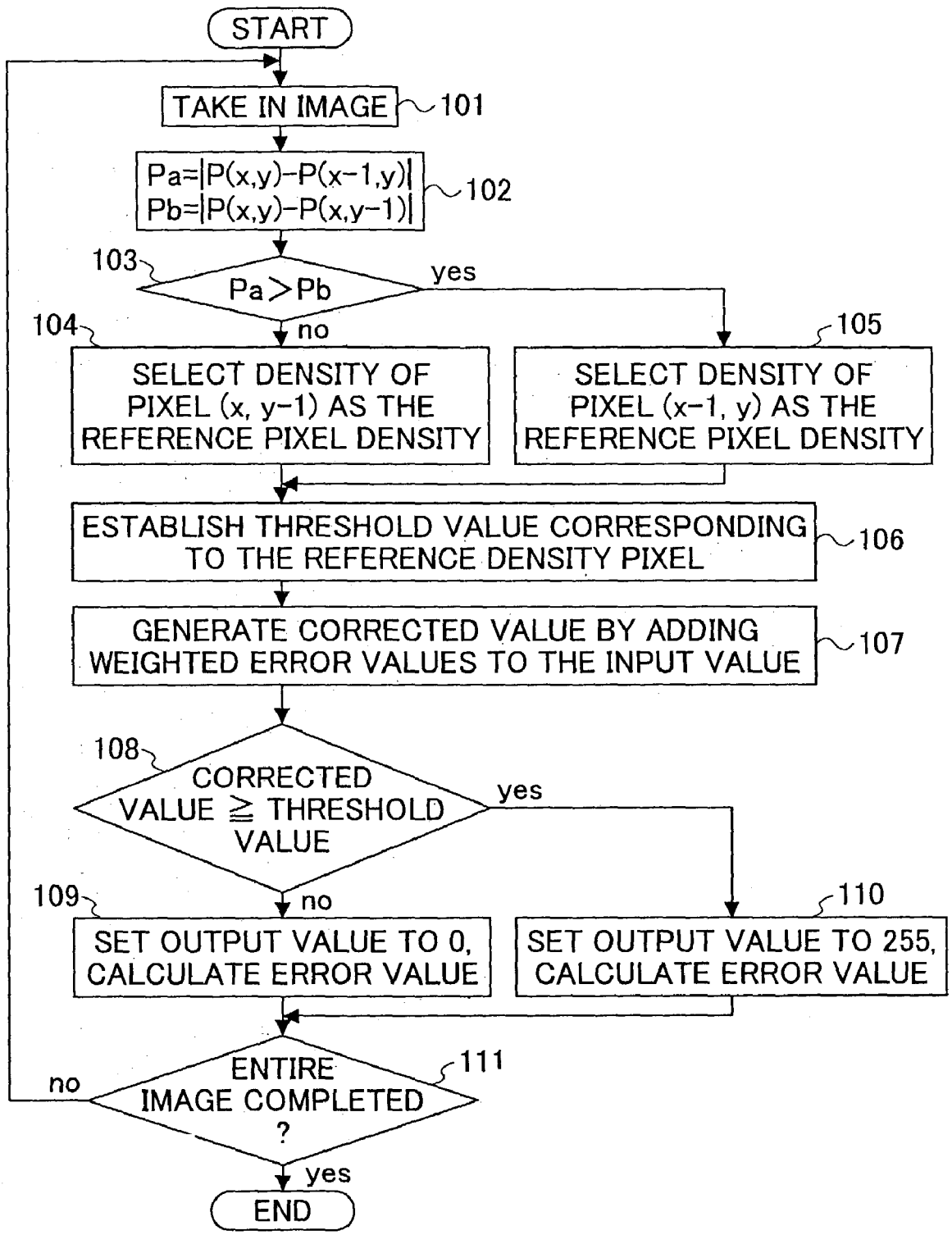
FIG. 22 shows a process flowchart of the first embodiment of the present invention.

In the following, the operation of the error diffusion process according to the first embodiment, wherein the threshold values shown in FIG. 6 are used and the threshold value corresponding to the adjacent pixels of FIG. 18 is implemented, is described. FIG. 22 is a process flowchart of the first embodiment of the present invention. First, image data for two lines are stored in the image memory 9 and the density information of the target pixel P0 and the adjacent pixels P1 and P2 of FIG. 18 is taken into the neighboring pixel density difference detection part 8 (step 101). Next, in the neighboring pixel density difference detection part 8, the absolute value of the density difference between the target pixel P0 and the adjacent pixels P1 and P2, Pa=|P(x, y)−P(x−1, y)| and Pb=|P(x, y)−P(x, y−1)| are calculated (step 102). The calculated absolute values Pa and Pb of the density differences are compared. If Pa is greater than Pb (step 103 yes), the density of the pixel P2 (x−1, y) is selected as the reference pixel density in determining the threshold value (step 105). If Pa is less than Pb (step 103 no) the density of the pixel P1 (x, y−1) is selected as the reference pixel density in determining the threshold value (step 104).

The threshold value quantity determination part 10 includes an LUT, for example, wherein a specific input value has a corresponding threshold value as shown in FIG. 6 and the corresponding threshold value is read out from a table with the input value as an address. As described above, the threshold value corresponding to the reference pixel density selected in the detection part 8 is read out from the table and is determined in the threshold value quantity determination part 10 (step 106).

Figures 23, 24:
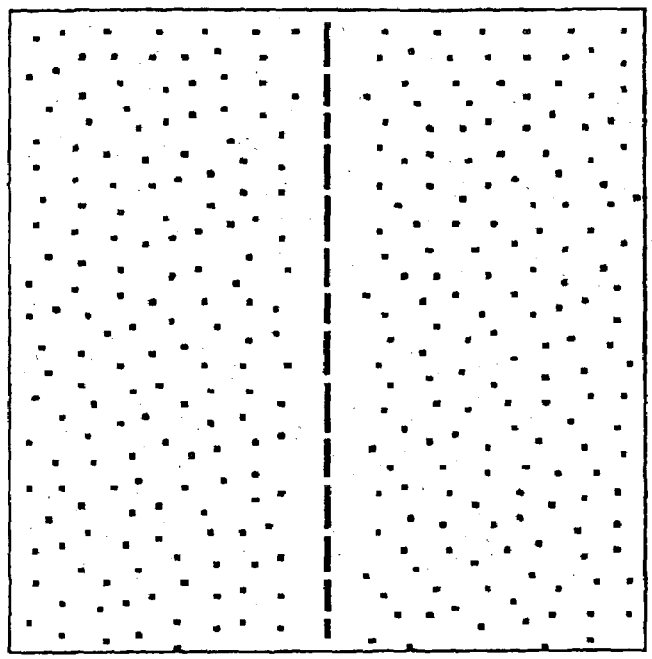
FIG. 23 shows the result of performing the process of the first embodiment on the image of FIG. 13.
FIG. 24 shows another example of reference pixel positions adjacent to the target pixel.

In the adder 2, the error values around the target pixel calculated beforehand and the input value is added to obtain a corrected value (step 107). The corrected value is input to the quantization part 3 and is compared with the threshold value determined in the threshold value quantity determination part 10. If the corrected value is equal to or above the threshold value (step 108 yes), the output value 225 (dot on) is output and the difference between the value before quantization and the value after quantization is obtained at the subtractor 5. The subtraction result is stored in the error memory 6 of the target pixel position as the error value (step 110) If the corrected value is below the threshold value (step 108 no), the output value 0 (dot off) is output and the error value is calculated (step 109). The above-described process is performed for all the pixels of the image (step 111). FIG. 23 shows the resulting reproduction obtained by performing the process according to the first embodiment on the image shown in FIG. 13. As can be seen in FIG. 23, the sharpness at the edge portions is optimized.

In the above example, the density difference is obtained by referring to the pixels (x−1, y) and (x, y−1) that are adjacent to the target pixel; however, the above density difference may also be obtained from a combination of a plurality of adjacent pixels as shown in FIG. 24. That is, when the coordinates of the target pixel are denoted as (x, y), the coordinates of each of its adjacent pixels are (x−1, y−1), (x, y−1), (x+1, y−1), (x−1, y), (x+1, y), (x−1, y+1), (x, y+1), and (x+1, y+1). Since there are edges in a plurality of directions, the absolute value of the density difference between the target pixel and each of the adjacent pixels may be obtained for comparison and the threshold value corresponding to the density of the pixel with a large absolute value in the density difference may be selected. Alternatively, the absolute value of the density difference between the target pixel P(x, y) and each of the four pixels that have already been processed, namely, pixels P(x−1, y−1), P(x, y−1), P(x+1, y−1), P(x−1, y), may be obtained for the comparison and the threshold value corresponding to the density of the pixel having a large absolute value in the density difference may be selected. On the other hand, the absolute value of the density difference between the target pixel P(x, y) and each of the four pixels that have not yet been processed, namely, pixels P(x+1, y), P(x−1, y+1), P(x, y+1), P(x+1, y+1), may be obtained for the comparison and the threshold value corresponding to the density of the pixel having a large absolute value in the density difference may be selected.

Similarly, the density difference may be obtained from a plurality of neighboring pixels as shown in FIG. 25. In FIG. 25, when the target pixel is denoted as (x, y), the coordinates of each of the neighboring pixels are (x−5, y−5), . . . (x−1, y−5), (x, y−5), . . . (x−5, y−1), . . . (x−1, y−1), (x, y−1), (x−5, y), . . . and (x−1, y). Herein, the absolute value of the density difference between the target pixel and each and every one of the pixels shown in FIG. 25 or each of at least two pixels in two directions shown in FIG. 25 is obtained for comparison and the threshold value corresponding to the density of the pixel having the greatest absolute value in the density difference may be selected.

Also, the threshold value corresponding to the density of the pixel at any one of the pixel positions (x−5, y−5), (x, y−5), or (x−5, y) in FIG. 25 may be selected. In this example, the threshold value is established by referring to the density of a pixel at a position distanced away from the target pixel by 5 pixels. However, the responsiveness in the recovery of sharpness will not be delayed by 5 pixels; rather, the effect of sharpness recovery can be maintained to match that in the case where two adjacent pixels are referred to as in FIG. 18. Also, the neighboring pixels in symmetrical positions with respect to that of FIG. 25 may be referred to (FIG. 26), as in the relationship between FIG. 18 and FIG. 20. Moreover, the threshold value may be established by referring to the density difference detected in other neighboring pixels shown in neither FIG. 25 nor FIG. 26.

(Embodiment 2)

In the above-described first embodiment, the threshold value varying in accordance with the input value (density) as shown in FIG. 6 is used and the sharpness can be controlled by determining the threshold value corresponding to the density of a neighboring pixel. However, the emphasizing effect depends on the inclination of the threshold value of FIG. 6.

Depending on the image design, there are instances in which greater emphasis on sharpness is demanded in the image, and there are instances in which the emphasizing effect is not greatly demanded. Thus, in a case where greater emphasis is demanded, the threshold value can be lowered when the edge has a raised density and the threshold value can be raised when the edge has a lowered density. On the other hand, in a case where emphasis is not greatly demanded, the threshold value is set slightly higher when the edge has a raised density and the threshold value is set slightly lower when the edge has a lowered density.

In the present embodiment, the threshold value corresponding to the density of the neighboring pixel is multiplied or divided by an emphasizing effect controlling coefficient α in order to control the sharpness of the image. In a case in which a greater emphasizing effect is desired, the emphasizing effect controlling coefficient α is set to be α>1, wherein the predetermined threshold value is divided by the emphasizing effect controlling coefficient α when the edge has a raised density so that the threshold value is lowered and the dot generation is quickened, and the predetermined threshold value is multiplied by the emphasizing effect controlling coefficient α when the edge has a lowered density so that the threshold value is set higher and the dot generation is delayed.

Similarly, when the emphasizing effect is not desired, the emphasizing effect controlling coefficient α is set to be α<1, wherein the predetermined threshold value is divided by the emphasizing effect controlling coefficient α when the edge has a raised density so that the threshold value is higher and the dot generation is slightly delayed compared to the predetermined threshold value, and the predetermined threshold value is multiplied by the coefficient α when the edge has a lowered density so that the threshold value is set lower and the dot generation is slightly eased compared to the predetermined threshold value. The determination of whether the edge has a raised density or a lowered density can be easily made by comparing the density of the target pixel and the density of the reference pixel for the threshold determination.

Figure 27:
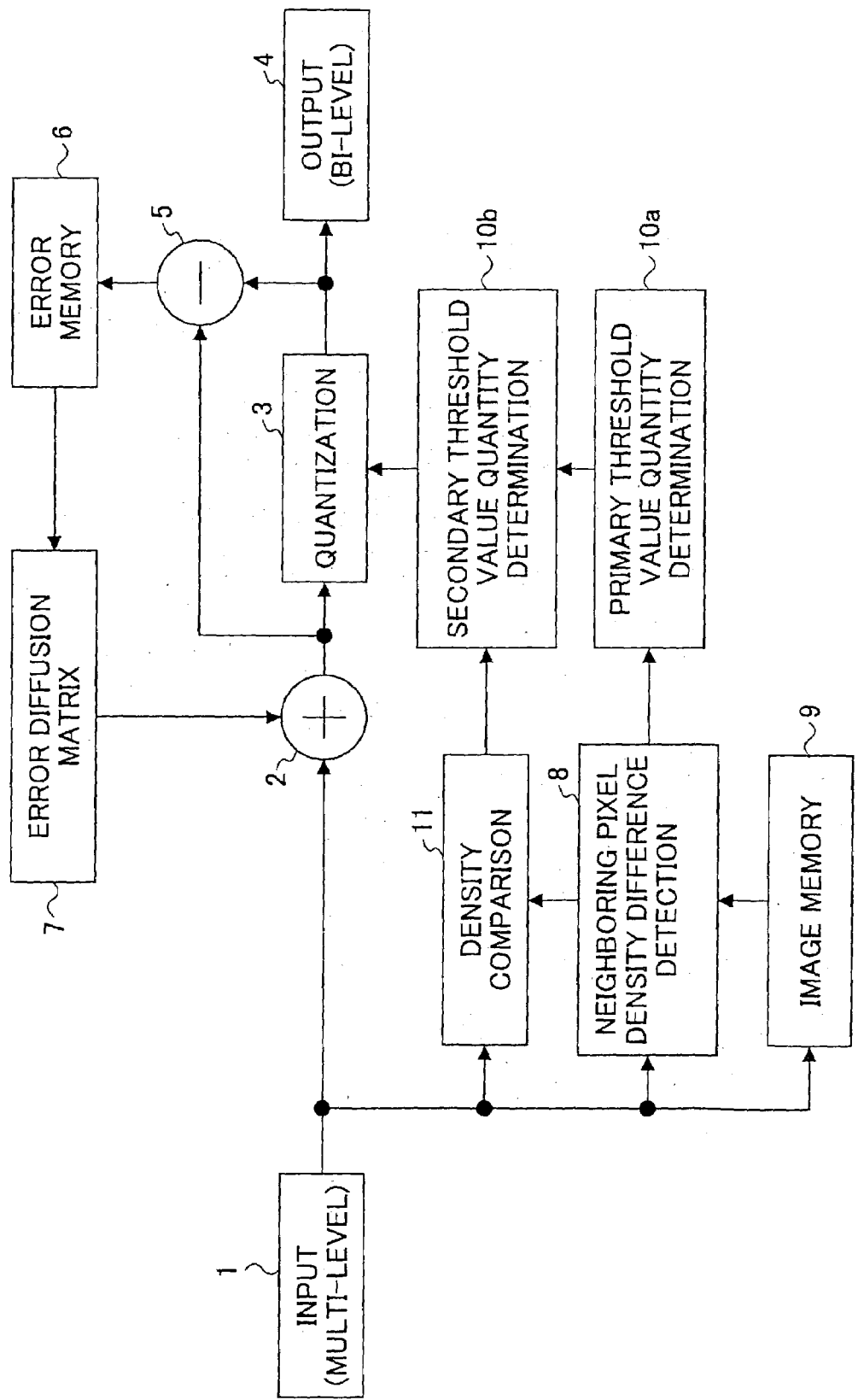
FIG. 27 shows a configuration of a second embodiment of the present invention.
Figure 28:
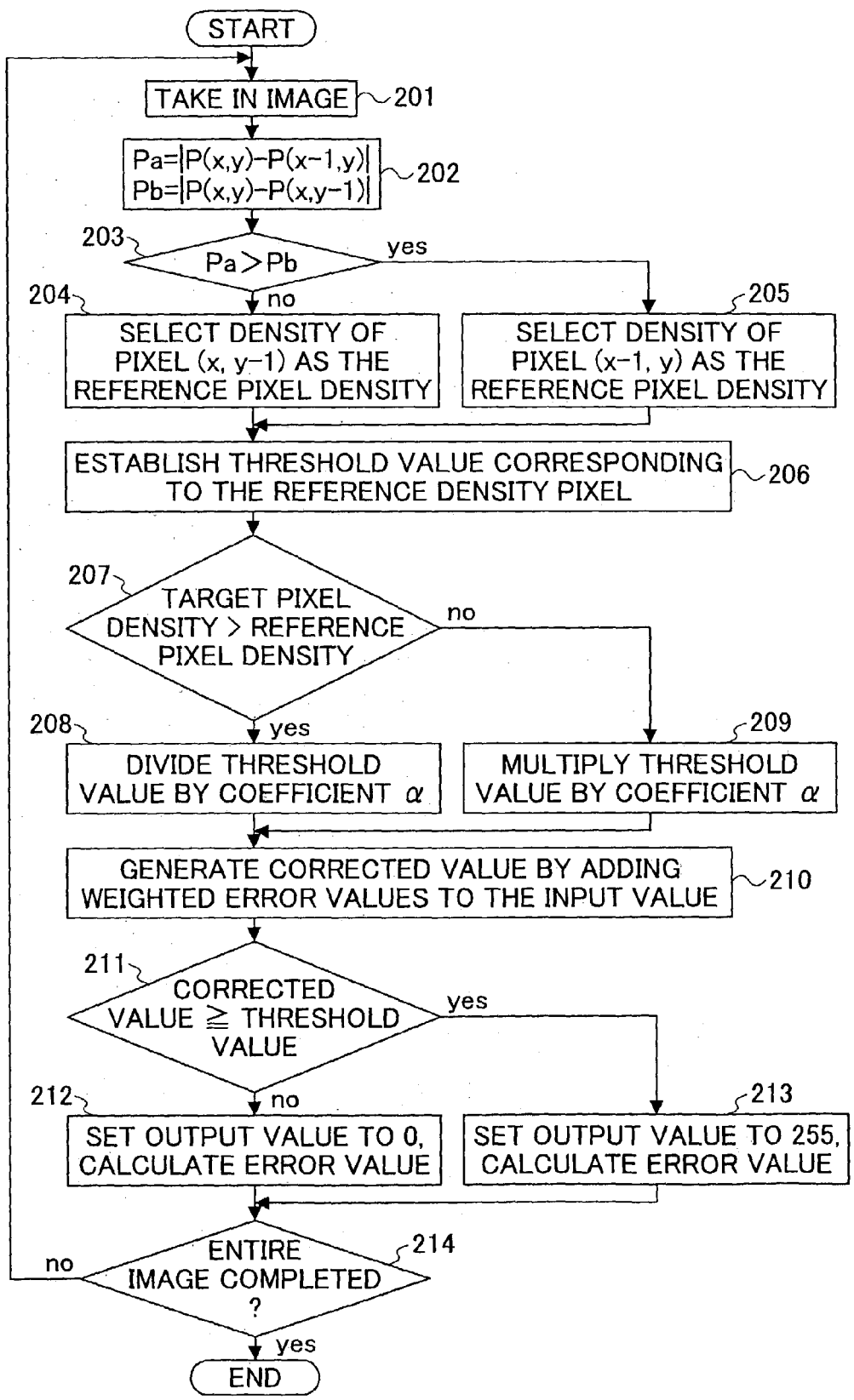
FIG. 28 shows a process flowchart of the second embodiment of the present invention.

FIG. 27 is diagram showing the configuration of the second embodiment of the present invention. In the second embodiment, a density comparison part 11 is added to the configuration of the first embodiment. Also, the threshold value quantity determination part 10 in the first embodiment is replaced with a primary threshold value quantity determination part 10a and a secondary threshold value quantity determination part 10b. FIG. 28 is a process flowchart of the second embodiment of the present invention.

In the following, the operation of the second embodiment is described with reference to FIGS. 27 and 28. The process until step 202 is identical to that of the first embodiment. Then, the neighboring pixel density difference detection part 8 compares the absolute values of the density difference Pa and Pb. If Pa is greater than Pb (step 203 yes), the density of the pixel P2(x−1, y) is selected as the reference pixel density for determining the threshold value (step 205) and if Pa is less than Pb (step 203 no), the density of the pixel Pl(x, y−1) is selected as the reference pixel density for determining the threshold value (step 204).

Next, the threshold value corresponding to the reference pixel density selected at the neighboring pixel density difference detection part 8 is established at the primary threshold value quantity determination part 10a (step 206). Also, the reference pixel density selected at the neighboring pixel density difference detection part 8 (the density of the pixel position with the largest absolute value) is input to the density comparison part 11.

In the density comparison part 11, a comparison is made between the density of the target pixel of the input 1 and the reference pixel density selected at the detection part 8. The result of the comparison is sent to the secondary threshold value quantity determination part 10b. If the target pixel density is greater than the reference pixel density (step 207 yes), the secondary threshold value quantity determination part 10b sends the value obtained from dividing the threshold value established in the primary threshold value quantity determination part 10a by the emphasizing effect controlling coefficient α to the quantization part 3 as a new threshold value (step 208). If the target pixel density is less than the reference pixel density (step 207 no), the secondary threshold value quantity determination part 10b sends the value obtained from multiplying the threshold value determined in the primary threshold value quantity determination part 10a by the emphasizing effect controlling coefficient α to the quantization part 3 as a new threshold value (step 209). The rest of the process is identical to that of the first embodiment, and thereby its description is omitted. It should be noted that the above coefficient α is variable, and this coefficient α can be set manually by the operator or automatically. Further, instead of dividing and multiplying by α, a predetermined number may be added to or subtracted from the threshold value determined in the primary threshold value quantity determination part 10a.

(Embodiment 3)

In an output apparatus that has different reproducibility of thin lines depending on the scanning direction (primary scanning or sub scanning) such as the electrophotographic imaging apparatus, the emphasizing effect controlling coefficient α for the primary scanning and that for the sub scanning are preferably varied. In such a case, the predetermined coefficient for controlling the emphasis level being denoted as α, individual coefficients are assigned to each of the primary scanning and the sub scanning and a different coefficient α is used for each of the different scanning directions.

Figure 29:
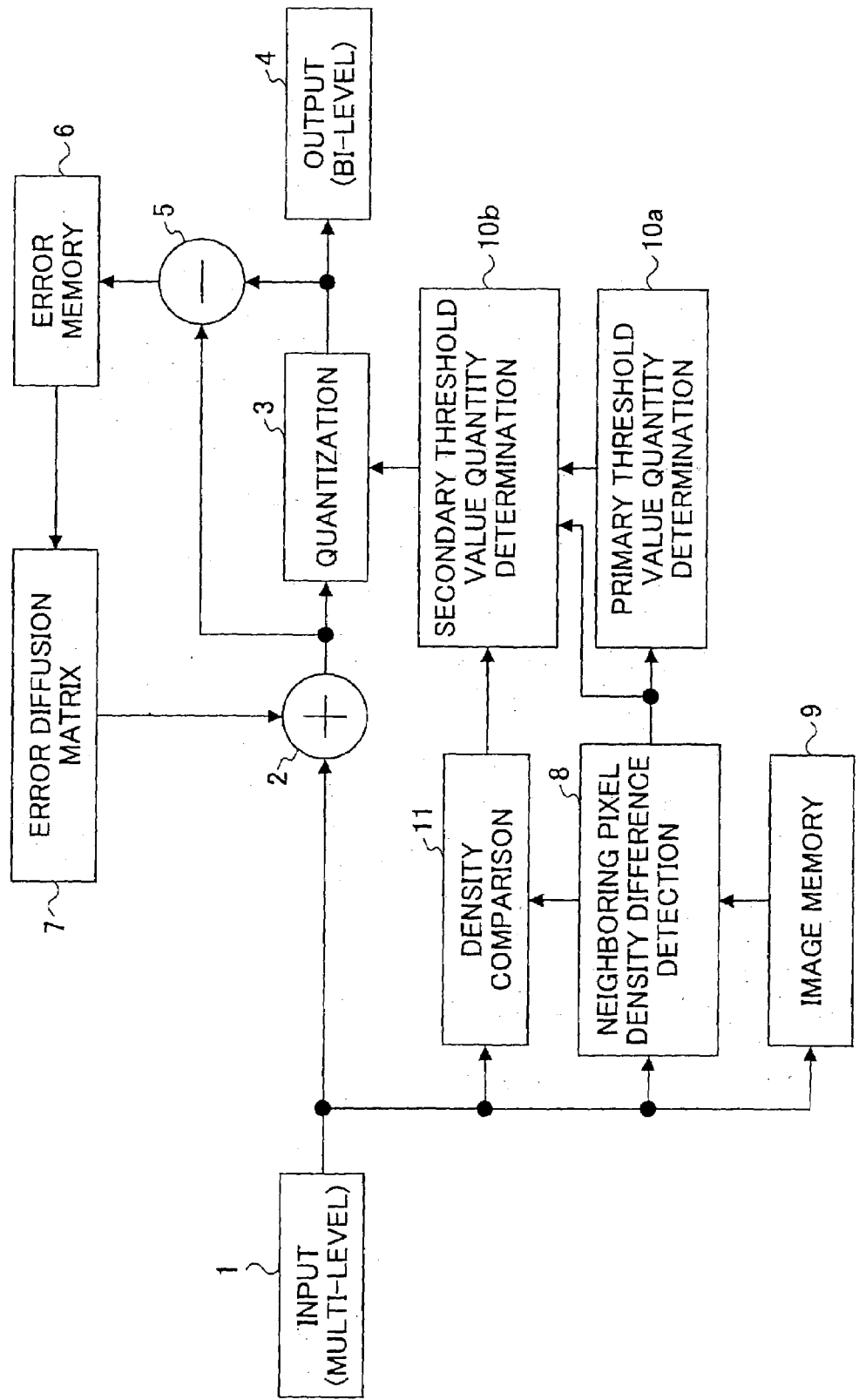
FIG. 29 shows a configuration of a third embodiment of the present invention.
Figure 30:
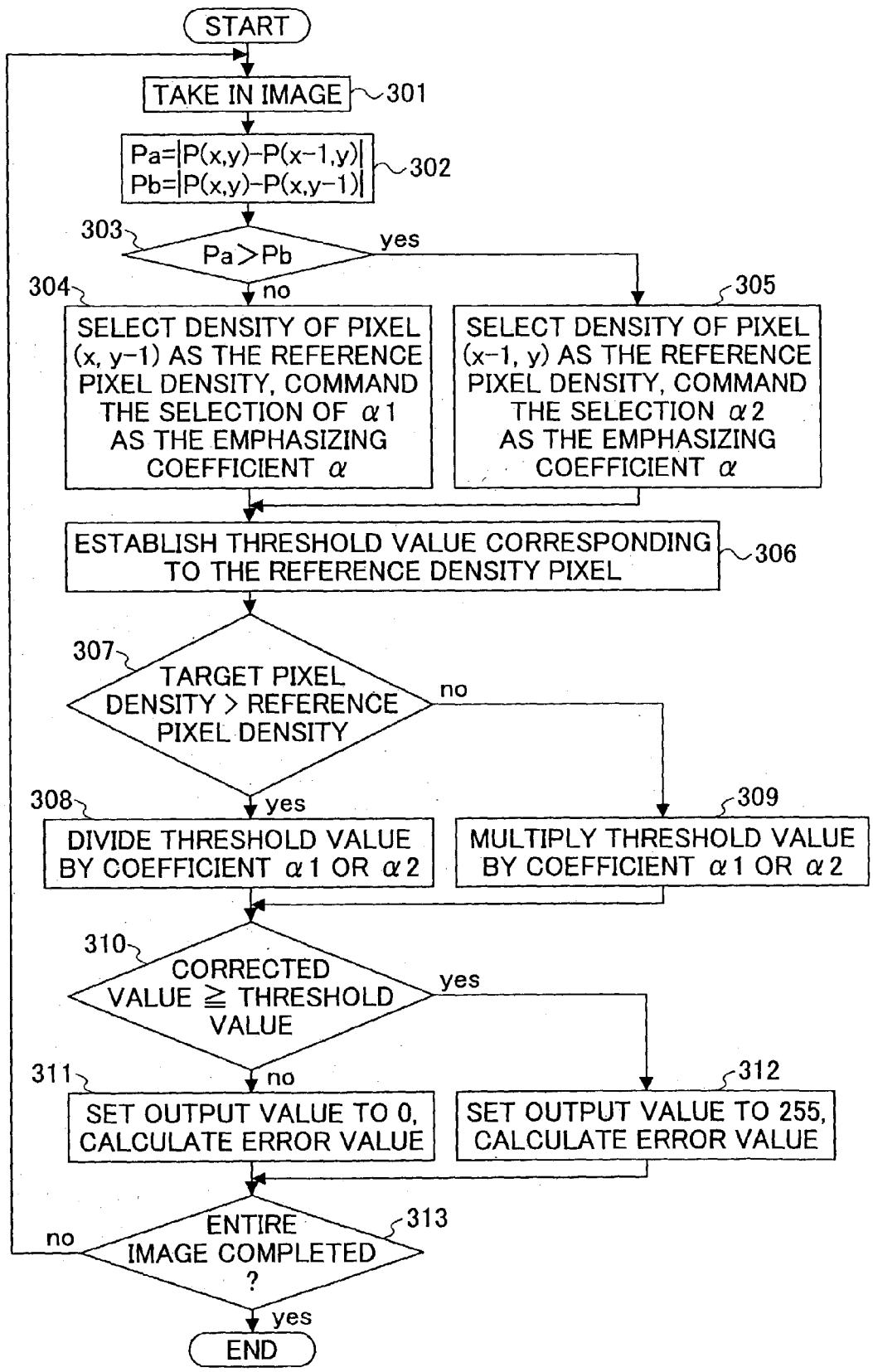
FIG. 30 shows a process flow chart of the third embodiment of the present invention.

FIG. 29 shows the configuration of the third embodiment of the present invention. The difference between the second and third embodiment is that in the third embodiment, a signal for selecting either a coefficient α1 or α2 is sent to the secondary threshold value quantity determination part 10b from the detection part 8. That is, the detection part 8 notifies the secondary threshold value quantity determination part 10b of the direction (primary scanning or sub scanning) of the pixel that it has been selected as the reference pixel for determining the threshold value. FIG. 30 is a process flowchart of the third embodiment of the present invention.

In FIG. 30, the process until step 303 is identical to that of the second embodiment. The neighboring pixel density difference detection part 8 compares the absolute values of the density difference Pa and Pb. If Pa is greater than Pb (step 303 yes), the density of the pixel P2(x−1, y) is selected as the reference pixel density for determining the threshold value and also, a signal commanding the selection of α=α2 as the emphasizing coefficient α is sent to the secondary threshold value quantity determination part 10b (step 305). If Pa is less than Pb (step 303 no), the density of the pixel P1(x, y−1) is selected as the reference pixel density for determining the threshold value and a signal commanding the selection of α=α1 as the emphasizing coefficient α is sent to the secondary threshold value quantity determination part 10b (step 304).

Next, the threshold value corresponding to the reference pixel density selected at the neighboring pixel density difference detection part 8 is determined at the primary threshold value quantity determination part 10a (step 306). Also, the reference pixel density selected at the neighboring pixel density difference detection part 8 (the density of the pixel position with the largest absolute value) is input to the density comparison part 11.

In the density comparison part 11, a comparison is made between the density of the target pixel of the input 1 and the reference pixel density selected at the detection part 8. The result of the comparison is sent to the secondary threshold value quantity determination part 10b. If the target pixel density is greater than the reference pixel density (step 307 yes), the secondary threshold value quantity determination part 10b divides the threshold value determined in the primary threshold value quantity determination part 10a by the coefficient α1 or α2, selected based on the signal sent in either step 304 or step 305, and sends the calculated value to the quantization part 3 as a new threshold value (step 308). If, the target pixel density is less than the reference pixel density (step 307 no), the secondary threshold value quantity determination part 10b multiplies the threshold value determined in the primary threshold value quantity determination part 10a by the coefficient α1 or α2 selected based on the signal sent in either step 304 or step 305, and sends the calculated value to the quantization part 3 as a new threshold value (step 309). The rest of the process is identical to that of the first embodiment, and thereby its description is omitted.

It should be noted that in this embodiment, the detection part 8 sends a signal for the secondary threshold value quantity determination part 10b to select either coefficient α1 or α2 in determining the threshold value. However, as a modification of this embodiment, the detection part 8 may actually select the coefficient α1 or α2 to be used and send the selected coefficient information to the secondary threshold value quantity determination part 10b.

(Embodiment 4)

Figure 31:
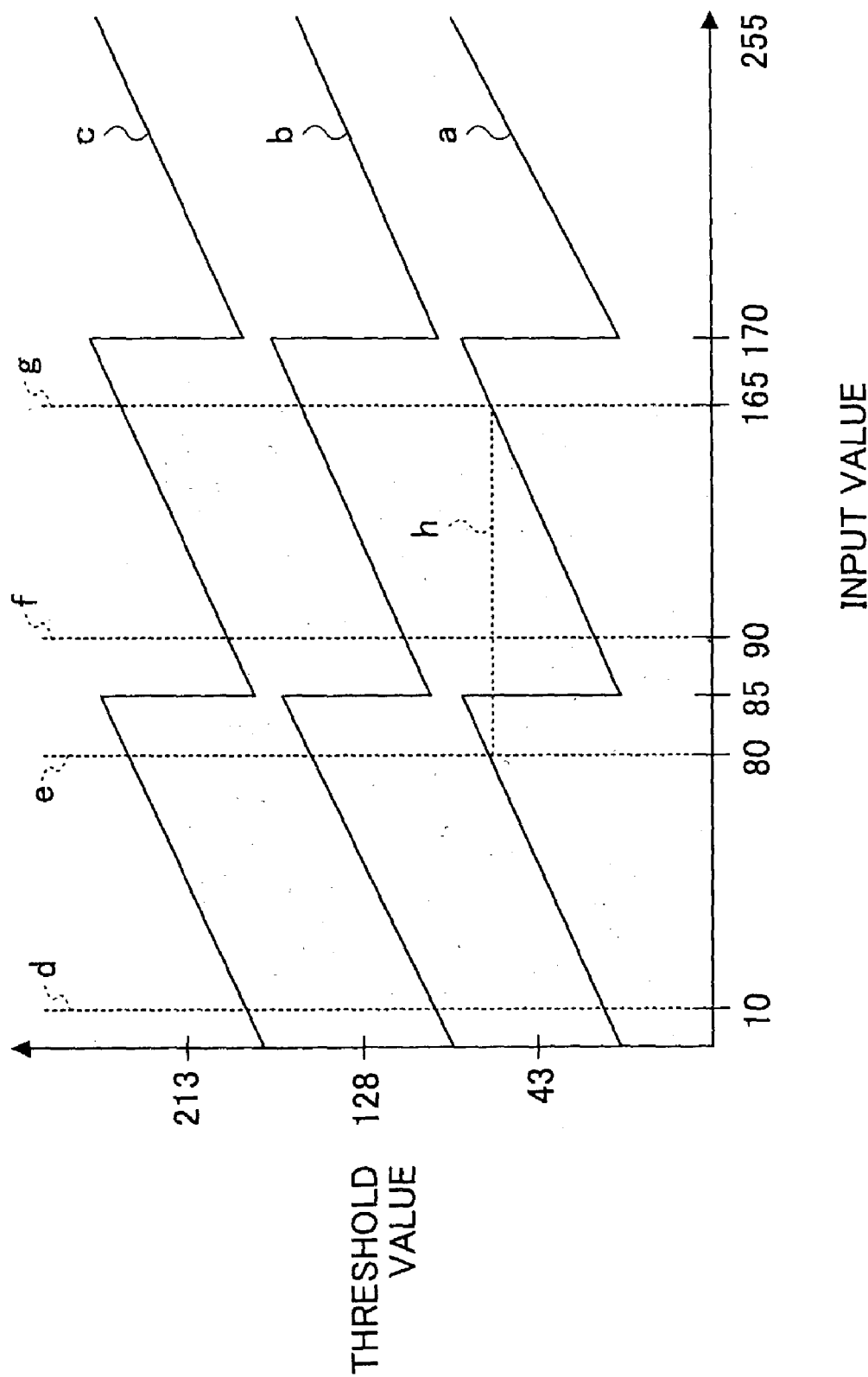
FIG. 31 shows the relationship between an input value and a threshold value in the case of a 4-level error diffusion.

In a fourth embodiment of the present invention, a 4-level error diffusion process is implemented. The fourth embodiment has the configuration of FIG. 21; however, the quantization part 3 and the output 4 each have four values. FIG. 31 shows the relationship between the input value and the threshold value in the 4-level error diffusion process. In FIG. 31, the N gray values (256 gray values) are divided into N−1 sections (3 sections) and a threshold value is set to increase along with the increase of the input value in each of the above sections.

In FIG. 31, line (a) represents a first threshold value 1 of the 4-level process; line (b) represents a second threshold value 2 of the 4-level process; and line (c) represents a third threshold value 3 of the 4-level process. Also, dotted line (d) is a support line indicating the threshold value of the input value 10; dotted line (e) is a support line indicating the threshold value of the input value 80; dotted line (f) is a support line indicating the threshold value of the input value 90; dotted line (g) is a support line indicating the threshold value of the input value 165; and dotted line (h) is a support line indicating the threshold value 1 of the input value 80 and the threshold value 1 of the input value 165.

Figure 32:
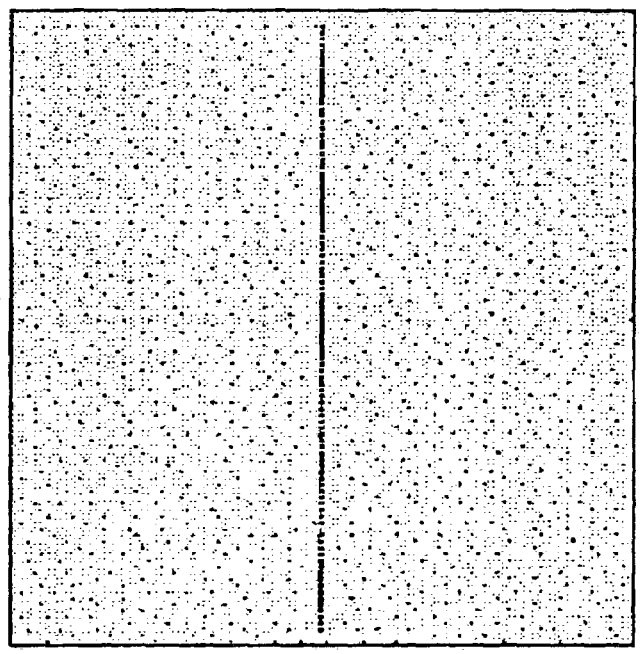
FIG. 32 shows the result of performing a simple 4-level error diffusion process on the image of FIG. 13.
Figure 33:
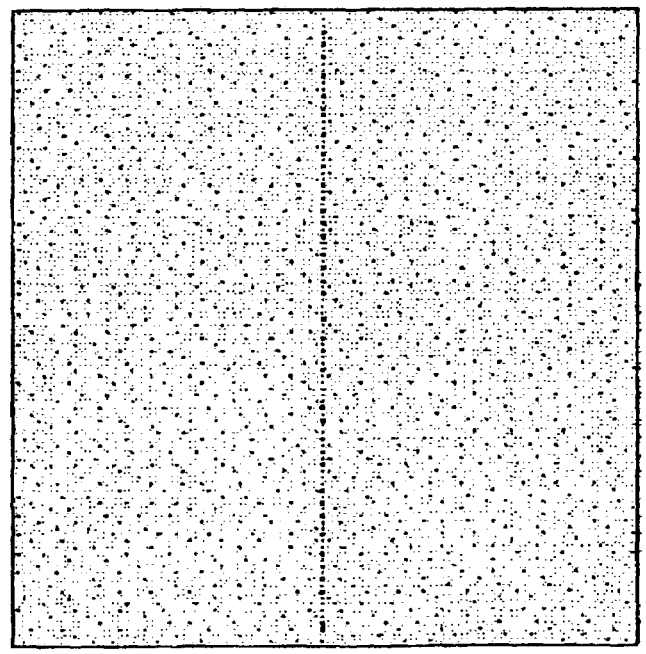
FIG. 33 shows the result of performing a 4-level error diffusion process on the image of FIG. 13 using the threshold value increasing according to an increase in the input value as shown in FIG. 31.

FIG. 32 shows the result of performing a simple 4-level error diffusion process (refer to FIG. 1) on the image of FIG. 13, and FIG. 33 shows the result of performing a 4-level error diffusion process in which the threshold values change depending on the input value. In comparing the above two image reproductions of FIG. 32 and FIG. 33, it can be discerned that the sharpness is degraded in FIG. 33.

In the following, the fourth embodiment of the present invention is described in relation to different examples of the image of FIG. 13, divided into a background portion density and a line density. In order to simplify the following description, it is assumed that an emphasizing effect is not demanded at the threshold value corresponding to the density P(x−1, y) or P(x, y−1) of the pixel right before the edge portion.

In a first example, the gray values (density) of the background portion and the line are both within one section such as a case in which the background portion has a gray value of 10 and the line has a gray value of 80. In such a case, the density of the pixel right before the edge portion is referred to, as in the bi-level error diffusion process. Also, a case in which the threshold values are not reversed even though the gray values of the background and the line are in different sections such as when the gray value of the background is 10 and the gray value of the line is 165 fit into this example. Thus, the density of the pixel right before the edge portion is referred to, as in the bi-level error diffusion process.

In a second example, the gray values of the background portion and the line are in different sections and the threshold values are reversed such as when the gray value of the background is 80 and the gray value of the line is 90. Herein, the threshold value corresponding to the gray scale value 80 is higher than the threshold value corresponding to the gray scale value 90, thereby reversing the original input value order. Thus, dots are prevented from being generated at the edge portion and the dot generation is delayed by 1–2 pixels. However, there is no great difference between the background portion and the line in the original image from subjective evaluations, that is, the edge does not stand out in the image, and therefore, the degradation of image quality will be negligible.

In a third example, the gray values of the background portion and the line are in different sections but the threshold values do not differ such as when the gray value of the background is 80 and the gray value of the line is 165. In such a case, the threshold value does not decrease at the edge portion and therefore, the dot generation is not instigated at the edge portion. Since the threshold value is compared with the value obtained from adding the sum of product of the weighted neighboring pixel values to the input value, some dots are generated at the edge portion and even if a dot is not generated, an error value remains at the pixel position. From the above error value, a dot is generated at the next pixel. Since a dot is generated either at the edge portion or at the neighboring pixel not far off from the original edge, the sharpness of the edge will not be drastically degraded.

Figure 34:
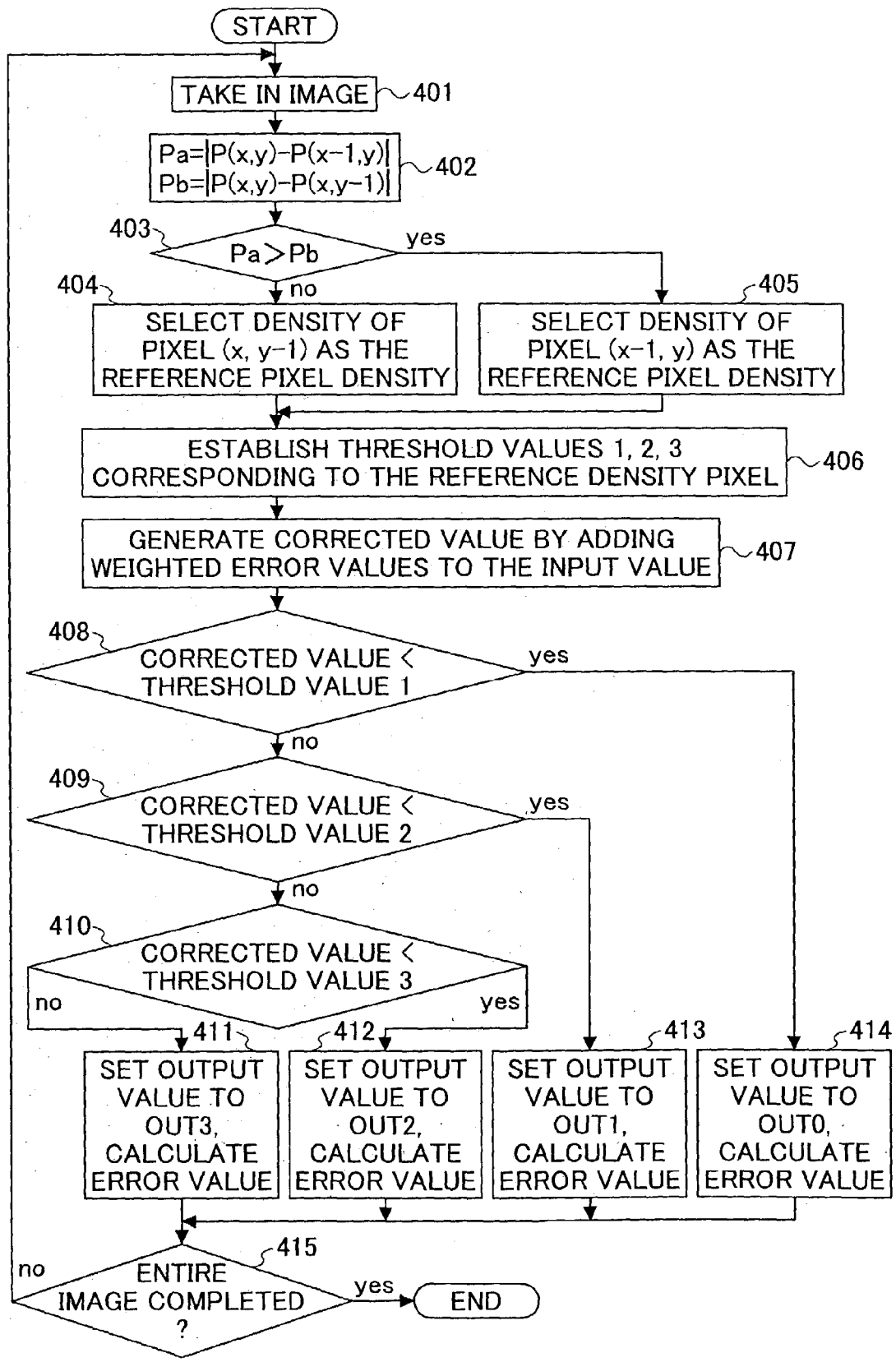
FIG. 34 shows a process flow chart of a fourth embodiment of the present invention.

FIG. 34 is a process flowchart of the fourth embodiment of the present invention. The difference between this process and that of the first embodiment is described in the following. The threshold value quantity determination part 10 is composed of an LUT, for example, and an input value (IN) is assigned to a corresponding threshold value as shown in FIG. 31. The corresponding threshold value is read out from a table with the input value as an address. The threshold value 1, threshold value 2, and threshold value 3 corresponding to a reference pixel density selected at the detection part 8 is read out from the table and is established at the threshold quantity determination part 10 (step 406).

Figure 35:
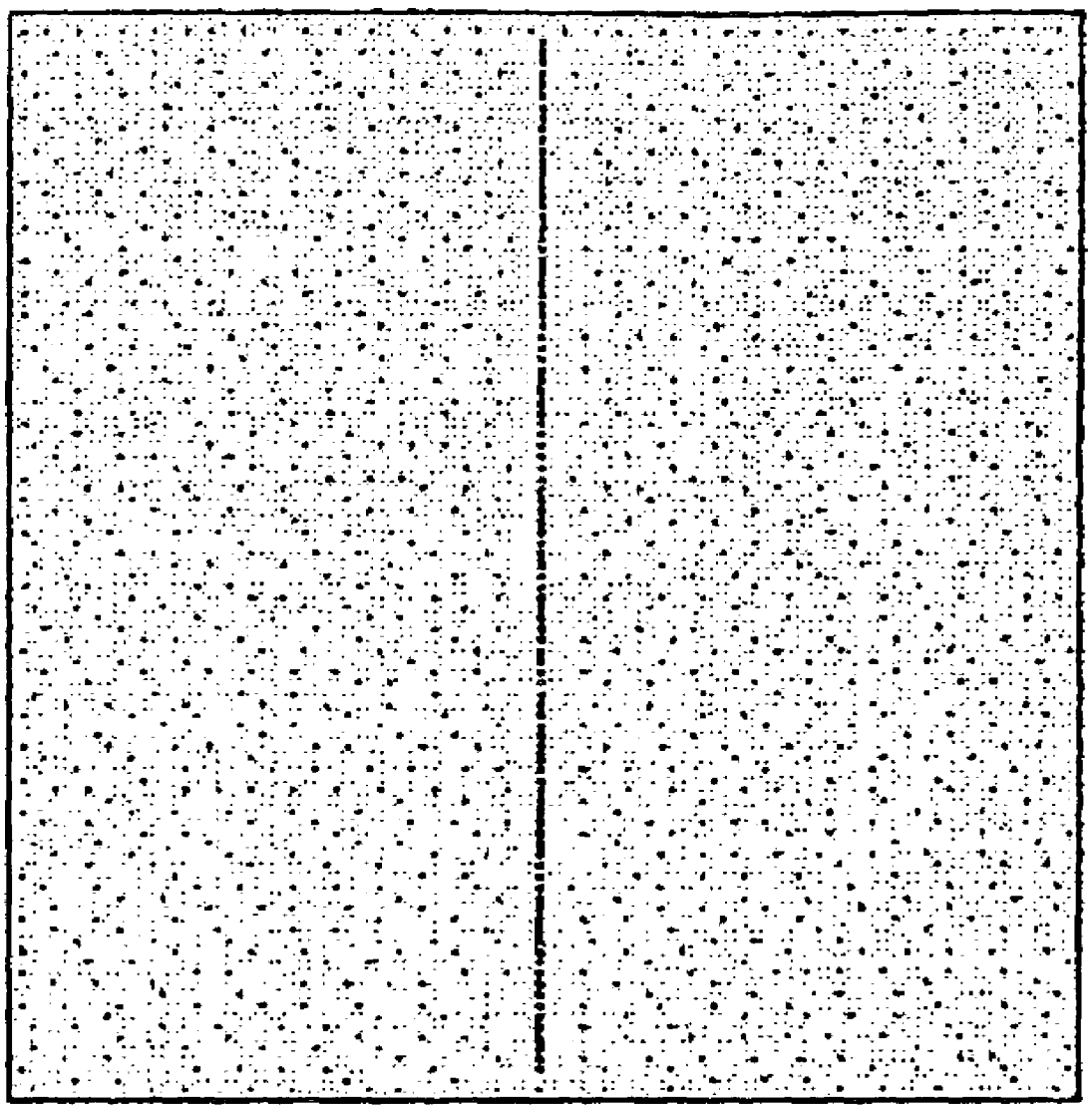
FIG. 35 shows the result of performing the process of the fourth embodiment on the image of FIG. 13.

The corrected value is input to the quantization part 3 and is compared to the threshold value 1, the threshold value 2, and the threshold value 3, determined at the threshold value quantity determination part 3. If the corrected value is less than the threshold value 1 (step 408 yes), an output value 0 (OUT0; dot off) is output after which the difference between the value before quantization and the value after quantization is obtained at the subtractor 5. The obtained difference is stored in the error memory 6 as the error value of the target pixel position (step 414). If the corrected value is above the threshold value 1 (step 408 no) and below the threshold value 2 (step 409 yes), the output value 85 (OUT1; small dot) is output and the error value is calculated (step 413). In a similar fashion, the output value 170 (OUT2; medium dot), and the output value 255 (OUT3; large dot) is output (step 411, 412). The above described process is performed for all the pixels in the image (step 415). FIG. 35 shows the result of processing the image of FIG. 13 according to the fourth embodiment. As shown in FIG. 35, the sharpness of the edge portion is improved.

In the 4-level error diffusion process, the emphasizing effect may also be controlled as in the previously-described second and third embodiments. This is realized by altering the quantization part 3 in FIG. 27 or FIG. 29 to have four values instead of two values.

In the above, a description of a 4-level error diffusion process according to the present invention has been given; however, the present invention can easily augment the output values to realize an N-level error diffusion process. Herein, the sharpness of the image can be maintained by setting a threshold value according to the density of an adjacent pixel as in the bi-level error diffusion process.

Additionally, from the descriptions above, it can be rightly presumed that the present invention be implemented by hardware. However, the present invention may also be implemented by software using a general-purpose computer system. In this case, programs for realizing the imaging operations and process steps (refer to FIGS. 22, 28, 30, 34, etc.) of the present invention are stored in a storage medium and the like. In turn, the above programs in the storage medium are read out to the computer system and executed by a CPU, thereby realizing the imaging functions of the present invention. Also, in the present invention, image data read out by a scanner or image data prepared in a hard disk are used. Alternatively, the image data may be taken in via a network and the like. The processing result is output to a printer or a hard disk, or it may be output to an external apparatus (such as a printer) via a network.

As described above, according to the present invention, the following effects can be obtained.

(1) The threshold value being established based on the relationship between a target pixel and at least two neighboring pixels in two different directions, the delay in dot generation can be prevented and the density of the image pattern portion can be accurately reproduced. Also, since the dot generation is enhanced at the image transition portion, image sharpness can be realized therein. This effect can be obtained in at least two different directions of an image and the sharpness is equally controlled for the above image directions.

(2) The threshold value being determined to have a rising inclination, the delay in dot generation, particularly the multi-level dots around the quantization output value, is prevented and the density of the image pattern portion can be accurately reproduced.

(3) The sharpness of the image transition portion can be controlled in a horizontal and vertical direction of the image, and the emphasis of the image can also be controlled in both of these directions.

(4) The threshold value being obtained based on the differences between the target pixel and the pixels above and to the left of the target pixel, the sharpness in the horizontal and vertical directions of the image can be easily controlled.

(5) The threshold value being obtained based on the relationship between the target pixel and each of the already-processed four adjacent pixels, the sharpness of the image transition portion can be equally controlled with respect to all the surrounding directions.

(6) The threshold value being obtained based on the absolute value or the square value of the density difference between the target pixel and its neighboring pixels, the sharpness of the image transition portion can be controlled.

(7) The threshold value being established by selecting the neighboring pixel with a large absolute value in density difference, the delay in dot generation occurring around the quantization output value of the multi-level error diffusion process can be prevented, and the sharpness is controlled so that the image transition portion can be emphasized.

(8) The threshold value being obtained from the pixel located at the right of the target pixel along the primary scanning direction and from the pixel located below the target pixel along the sub scanning direction, the sharpness of the image is controlled so that the image transition in the right edge direction or the down edge direction can be emphasized.

(9) The threshold value being obtained based on the relationship between the target pixel and each of the yet-to-be-processed four adjacent pixels, the sharpness can be controlled in an image density transition from the right side of the image to a downward direction.

(10) The threshold value being established based on the relationship between at least the target pixel and a pixel of a specific direction, and the target pixel and a pixel of a direction symmetric to the above specific direction, the degree of emphasis on the image density transition can be equally controlled from both sides.

(11) The selected neighboring pixel being multiplied by a coefficient, the degree of emphasis on the image density transition can be freely controlled.

(12) The multiplying coefficient being variable, the degree of emphasis on the image density transition can be freely controlled in accordance with the image output apparatus, the image output mode, the emphasis specifications, and the like so that the image quality of preference can be obtained.

(13) The multiplying coefficient being greater than or equal to 1, the degree of emphasis on the image density transition can be controlled to have strong effects. Also by setting the multiplying coefficient to be less than 1, the degree of emphasis on the image density transition can be weakened so that an image complying more with the graininess of the image pattern or the gray scale can be obtained.

(14) A predetermined number being added to or subtracted from the selected neighboring pixel value, the degree of emphasis on the image density transition can be freely controlled. Also, since the threshold values are weighted differently depending on the primary scanning and sub scanning directions, the degree of emphasis on the image density transition can be freely controlled according to the image direction.

This patent application is based on and claims the benefit of the earlier filing date of Japanese patent application No. 2002-059850 filed Mar. 6, 2002, the entire contents of which are hereby incorporated by reference.

What is claimed is:

1. An imaging apparatus, comprising:

an error diffusion process part that diffuses an error produced through quantization of a neighboring pixel in a pixel value of a target pixel to obtain an error-diffused pixel value of the target pixel;

a quantization part that quantizes an image of M gray levels into an N-level dot image (M>N) by comparing the error-diffused pixel value of the target pixel obtained by the error diffusion part with a threshold value used for quantization of the target pixel, wherein said M gray levels are divided into N−1 sections and a threshold value of at least one section varies depending on input information on the target pixel;

a neighboring pixel information detection part that detects information on the neighboring pixel; and a threshold value determination part that determines said threshold value used for quantization of said target pixel by referring to said information on the neighboring pixel.

2. An imaging apparatus, comprising:

an error diffusion process part that diffuses an error produced through quantization of a neighboring pixel in a pixel value of a target pixel to obtain an error-diffused pixel value of the target pixel;

a quantization part that quantizes an image of M gray levels into an N-level dot image (M>N) by comparing the error-diffused pixel value of the target pixel obtained by the error diffusion part with a threshold value used for quantization of the target pixel, wherein said M gray levels are divided into N−1 sections and a threshold value of at least one section varies depending on an input density of the target pixel;

a neighboring pixel density difference detection part that detects a density of the neighboring pixel; and a threshold value determination part that determines said threshold value used for quantization of said target pixel by referring to said density of the neighboring pixel.

3. The imaging apparatus as claimed in claim 2, wherein:

said neighboring pixel density difference detection part calculates one of absolute values and square values of a difference in density between said target pixel and each of a plurality of neighboring pixels, compares said one of absolute values and square values of the density difference, and selects a density of a neighboring pixel that has one of a large absolute value and square value; and said threshold value determination part determines a threshold value corresponding to the density of the selected neighboring pixel.

4. The imaging apparatus as claimed in claim 3, wherein:

said threshold value determination part performs a predetermined computation on said threshold value corresponding to the density of the selected neighboring pixel.

5. The imaging apparatus as claimed in claim 4, further comprising:

a density comparison part that compares the density of the selected neighboring pixel with the density of the target pixel and sends the comparison result to said threshold value determination part; wherein said threshold value determination part further comprises a primary threshold value determination part that determines said threshold value corresponding to the density of the selected neighboring pixel, and a secondary threshold value determination part that receives said comparison result from the density comparison part and performs said predetermined computation on the threshold value determined in said primary threshold value determination part based on said comparison result.

6. The imaging apparatus as claimed in claim 4, wherein said predetermined computation corresponds to a multiplication of said threshold value corresponding to the density of said selected neighboring pixel by a predetermined coefficient.

7. The imaging apparatus as claimed in claim 4, wherein said predetermined computation corresponds to a division of said threshold value corresponding to the density of the selected neighboring pixel by a predetermined coefficient.

8. The imaging apparatus as claimed in claim 6, wherein said predetermined coefficient varies depending on the selected neighboring pixel.

9. The imaging apparatus as claimed in claim 7, wherein said predetermined coefficient varies depending on the selected neighboring pixel.

10. The imaging apparatus as claimed in claim 8, wherein said neighboring pixel density difference detection part sends a signal for the threshold value determination part to select said predetermined coefficient corresponding to the selected neighboring pixel.

11. The imaging apparatus as claimed in claim 9, wherein said neighboring pixel density difference detection part sends a signal for the threshold value determination part to select said predetermined coefficient corresponding to the selected neighboring pixel.

12. The imaging apparatus as claimed in claim 4, wherein said predetermined computation corresponds to an addition of a predetermined number to said threshold value corresponding to the density of the selected neighboring pixel.

13. The imaging apparatus as claimed in claim 4, wherein said predetermined computation corresponds to a subtraction of a predetermined number from said threshold value corresponding to the density of the selected neighboring pixel.

14. The imaging apparatus as claimed in claim 3, wherein said neighboring pixels are pixels in a primary scanning direction and a sub scanning direction.

15. The imaging apparatus as claimed in claim 3, wherein said neighboring pixels are adjacent pixels of said target pixel.

16. The imaging apparatus as claimed in claim 15, wherein said neighboring pixels are four adjacent pixels that have already been processed.

17. The imaging apparatus as claimed in claim 15, wherein said neighboring pixels are four adjacent pixels that have not yet been processed.

18. An imaging method, comprising the steps of:

diffusing an error produced through quantization of a neighboring pixel in a pixel value of a target pixel to obtain an error-diffused pixel value of the target pixel;

quantizing an image of M gray levels into an N-level dot image (M>N) by comparing the error-diffused pixel value of the target pixel with a threshold value used for quantization of the target pixel, said M gray levels being divided into N−1 sections, a threshold value of at least one section varying depending on an input density of the target pixel; and determining the threshold value used for quantization of said target pixel by referring to a density of the neighboring pixel.

19. The imaging method as claimed in claim 18, further comprising the steps of:

calculating one of absolute values and square values of a difference in density between said target pixel and each of a plurality of neighboring pixels;

comparing the one of calculated absolute values and square values of the density difference;

selecting a density of a neighboring pixel that has one of a large absolute value and square value; and determining a threshold value corresponding to the density of the selected neighboring pixel.

20. The imaging method as claimed in claim 19, further comprising the steps of performing a predetermined computation on the threshold value corresponding to the density of the selected neighboring pixel.

* * * * *